United States Patent
Mori et al.

(10) Patent No.: US 8,886,428 B2
(45) Date of Patent: Nov. 11, 2014

(54) UNLOCKING CONTROLLER OF IRREVERSIBLE ROTARY TRANSMISSION SYSTEM

(75) Inventors: Kenichi Mori, Sagamihara (JP); Yutaka Kaneko, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/877,052

(22) PCT Filed: Feb. 22, 2012

(86) PCT No.: PCT/JP2012/054195
§ 371 (c)(1),
(2), (4) Date: Apr. 10, 2013

(87) PCT Pub. No.: WO2012/147399
PCT Pub. Date: Nov. 1, 2012

(65) Prior Publication Data
US 2014/0039771 A1 Feb. 6, 2014

(30) Foreign Application Priority Data
Apr. 27, 2011 (JP) ................................ 2011-099076

(51) Int. Cl.
*G06F 19/00* (2011.01)
*F16H 13/00* (2006.01)

(52) U.S. Cl.
USPC ................ 701/67; 476/61; 476/48; 74/665 F; 74/664

(58) Field of Classification Search
USPC ....... 701/67; 476/61, 48, 1, 23; 74/665 F, 664
See application file for complete search history.

(56) References Cited

U.S. PATENT DOCUMENTS

| | | | | |
|---|---|---|---|---|
| 4,706,791 A | * | 11/1987 | Magliano | 192/223.2 |
| 5,573,094 A | * | 11/1996 | Roberts | 192/45.002 |
| 8,500,596 B2 | * | 8/2013 | Sakagami et al. | 476/48 |
| 2004/0216557 A1 | * | 11/2004 | Griesmeier | 74/664 |
| 2011/0319223 A1 | * | 12/2011 | Sakagami et al. | 476/61 |
| 2014/0039771 A1 | * | 2/2014 | Mori et al. | 701/67 |

FOREIGN PATENT DOCUMENTS

| | | |
|---|---|---|
| JP | 2001-003773 A | 1/2001 |
| JP | 2001-028863 A | 1/2001 |
| JP | 2003-056596 A | 2/2003 |
| JP | 2007-002934 A | 1/2007 |
| JP | 2010-098889 A | 4/2010 |

* cited by examiner

*Primary Examiner* — Ronnie Mancho
(74) *Attorney, Agent, or Firm* — Global IP Counselors, LLP

(57) ABSTRACT

An unlocking controller is provided for an irreversible rotary transmission system having the irreversible rotary transmission system having an irreversible rotation transmission element arranged between an input shaft and an output shaft. The unlocking controller includes an input shaft rotation direction determination section and an unlocking torque setting section. The input shaft rotation direction determination section determines whether an input shaft rotational direction is the same as, or opposite to, a direction of the load torque of the output shaft. The unlocking torque setting section conducts an unlocking torque control that sets the unlocking torque a higher value when the input shaft rotational direction and the direction of the load torque of the output shaft are the same as while the lock is released, than when the input shaft rotational direction is opposite to the direction of the direction of the load torque of the output shaft.

20 Claims, 14 Drawing Sheets

UNLOCKING CONTROLLER OF IRREVERSIBLE ROTARY TRANSMISSION SYSTEM

CROSS-REFERENCE TO RELATED APPLICATIONS

This application is a U.S. National stage application of International Application No. PCT/JP2012/054195, filed Feb. 2, 2012, which claims priority under to Japanese Patent Application No. 2011-099076, filed in Japan on Apr. 27, 2011, the entire contents of which is hereby incorporated by reference.

BACKGROUND

1. Field of the Invention

The present invention relates to an unlocking controller of an irreversible rotary transmission system for control of the rotation position.

2. Background Information

A rotation transmission system for carrying out control of the rotation position works as follows: the system transmits the torque from the actuator to the control subject, and, when the control subject reaches the target rotation position, the control subject holds the actuator in the stop state, and the control subject holds the target rotation position.

However, depending on the control subject, when the actuator that should hold the control subject at the target rotation position is held in the stop state, a reactive force (the load torque) in a prescribed direction may be reversely input to the actuator.

In this case, in order to hold the actuator that should hold the control subject at the target rotation position in the stop state, it is necessary to keep applying driving control to the actuator so that a torque counteracting the reversely input force having the same magnitude as that of the reactive force (the load torque) in a prescribed direction is output, and the driving energy of the actuator increases. This is undesirable. In addition, the control operation becomes complicated, and this is also undesirable.

As a measure for solving the problem related to the reactive force (the load torque) reversely input to the actuator, in the prior art, as described in Japanese Laid-Open Patent Application No. 2001-003773, control is carried out on the nonlinear reactive force (the load torque) that varies corresponding to each rotation position (the rotational angle) of the control subject by feed forward compensation of the actuator torque corresponding to the rotation position (the rotational angle) of the control subject detected successively. Consequently, the control operation is complicated for the technology coping with the problems.

On the other hand, as a scheme to solve the previously described problem, to increase in the driving energy of the actuator, people have proposed the following scheme: a control system is formed in an irreversible rotary transmission system; that is, an irreversible rotation transmission element is inserted, and the irreversible rotation transmission element works as follows: in the transmission-off state, when the torque is not transmitted from the actuator to the control subject, the transmission assumes a lock state for the reactive force (the load torque) of the control subject, so that transmission of the reactive force (the load torque) to the actuator is prohibited, and the reactive force (they load torque) that would be reversely input to the actuator cannot go to the actuator. As a result, there is no need to keep applying the driving control on the actuator.

However, in this scheme, when the control transmits the torque from the actuator to the control subject, first of all, an unlocking torque in the rotational direction of the actuator should be applied on the irreversible rotation transmission element so that the irreversible rotation transmission element assumes the lock released state with this driving control of the actuator, and then the torque of the actuator can be transmitted via the irreversible rotation transmission element to the control subject.

In this case, in order to decrease the unlocking torque, in the prior art, as described in Japanese Laid-Open Patent Application No. 2007-002934, people have proposed a scheme in which, by applying a high frequency vibration, the frictional force for forming the lock state is decreased.

When an irreversible rotary transmission system is constructed by inserting an irreversible rotation transmission element, for the control system from the actuator to the control subject, the following problems take place for the configurations described in the Japanese Laid-Open Patent Application No. 2001-003773 and Japanese Laid-Open Patent Application No. 2007-002934.

That is, when the rotation position is controlled, as described above, first of all, an unlocking torque in the actuator rotational direction should be applied on the irreversible rotation transmission element to set the irreversible rotation transmission element in the lock released state.

However, during the period when unlocking has not yet been completed and the irreversible rotation transmission element has not yet been locked, if the configuration described in Japanese Laid-Open Patent Application No. 2001-003773 is adopted, even when the feed forward compensation is made on the reactive force (the load torque) from the control subject reversely input to the actuator, as the reactive force (the load torque) has not yet reached the actuator, the effects asserted by Japanese Laid-Open Patent Application No. 2001-003773 cannot be realized.

In addition, during the period when the irreversible rotation transmission element has not yet been in the locked state, according to the configuration described in Japanese Laid-Open Patent Application No. 2001-003773, a torque compensation may be carried out in the direction opposite to the unlocking torque, and the output of the feedback compensator is held for awaiting the arrival of the unlocking torque, so that a delay takes place in rise of the response; as the output of the feedback compensator is held, the response after unlocking degrades. This is undesirable.

On the other hand, when the configuration of the Japanese Laid-Open Patent Application No. 2007-002934 for decreasing the unlocking torque is adopted, as a high frequency vibration is applied to decrease the frictional force for holding the lock state, the desired effect cannot be realized.

That is, when the reactive force (the load torque) from the control subject is high, the engagement members in the lock mechanism in the irreversible rotation transmission element are forcibly engaged with each other; when the actuator is driven in the same direction as that of the reactive force (the load torque) in controlling the rotation position, if only the high frequency vibration is applied on the lock mechanism of the irreversible rotation transmission element according to the configuration of Japanese Laid-Open Patent Application No. 2007-002934, the unlocking torque cannot be significantly decreased, so that the irreversible rotation transmission element cannot quickly release the lock; thus, a significant delay in response takes place. This is undesirable.

The purpose of the present invention is to solve the previously described problems of the prior art described in Japanese Laid-Open Patent Application No. 2001-003773 and Japanese Laid-Open Patent Application No. 2007-002934 recited above by providing a unlocking controller of the irreversible rotary transmission system, wherein the magnitude of the unlocking torque on the irreversible rotation transmission element is changed corresponding to the actuator rotational direction when lock is released with respect to the direction of the reactive force (the load torque) from the control subject, so that even when the actuator rotates in the direction that causes the problem of delaying the response in unlocking, the unlocking response still can be maintained as desired.

In order to realize the purpose described above, the present invention provides an unlocking controller of the irreversible rotary transmission system with the following configuration: an input shaft that inputs the torque from the actuator; an output shaft that outputs the torque from the input shaft; and an irreversible rotation transmission element with the following features: the irreversible rotation transmission element is arranged between the input shaft and the output shaft described above; the irreversible rotation transmission element enacts driving control of the actuator described above so that, when the torque is transmitted from the input shaft to the output shaft, the torque described above is greater than the unlocking torque, so that the irreversible rotation transmission element assumes the lock released state that allows transmission of the torque described above; on the other hand, in the transmission-off state when the torque is not transmitted from the input shaft to the output shaft, the irreversible rotation transmission element is locked by the load torque of the output shaft, so that transmission of the load torque of the output shaft to the input shaft is prohibited.

According to the present invention, as a characteristic feature of the configuration, for the irreversible rotary transmission system described above, an input shaft rotation direction determination means when the lock is released and an unlocking torque setting means are arranged having the following features.

The former part, that is, the input shaft rotation direction determination means when the lock is released determines whether the input shaft rotational direction is the same as, or opposite to, the direction of the output shaft load torque.

The latter part, that is, the unlocking torque setting means responds to the result of the determination of the input shaft rotation direction determination means when the lock is released; when the input shaft rotational direction when lock is released is the same as the direction of the output shaft load torque, the unlocking torque is higher than that when they are opposite to each other.

For the unlocking controller of the irreversible rotary transmission system of the present invention, the unlocking torque when the input shaft rotational direction when the lock is released is the same as the direction of the output shaft load torque and is higher than that when the directions are opposite to each other. As a result, the following operation and effects can be realized.

When the input shaft rotational direction when the lock is released is the same as the direction of the output shaft load torque, and the lock is released in the same direction as the load torque applied on the output shaft, the engagement member, which has a higher engagement gripping force of the irreversible rotation transmission element under the influence of the high load torque applied on the output shaft, is pressed in the unlocking direction to release the lock of the irreversible rotation transmission element.

According to the present invention, in this case, because the unlocking torque is higher, even when the actuator rotates in the direction that used to be a problem due to the delay in the response in unlocking, the higher unlocking torque can maintain the unlocking response as desired, so that it is possible to prevent the problem related to the unlocking response described above.

BRIEF DESCRIPTION OF THE DRAWINGS

Referring now to the attached drawings which form a part of this original disclosure.

FIG. 15 shows the unlocking controller of the irreversible rotary transmission system in Example 2 of the present invention.

DETAILED DESCRIPTION OF THE EMBODIMENTS

In the following, Examples of the present invention will be explained with reference to the annexed figures.

Figure 1:
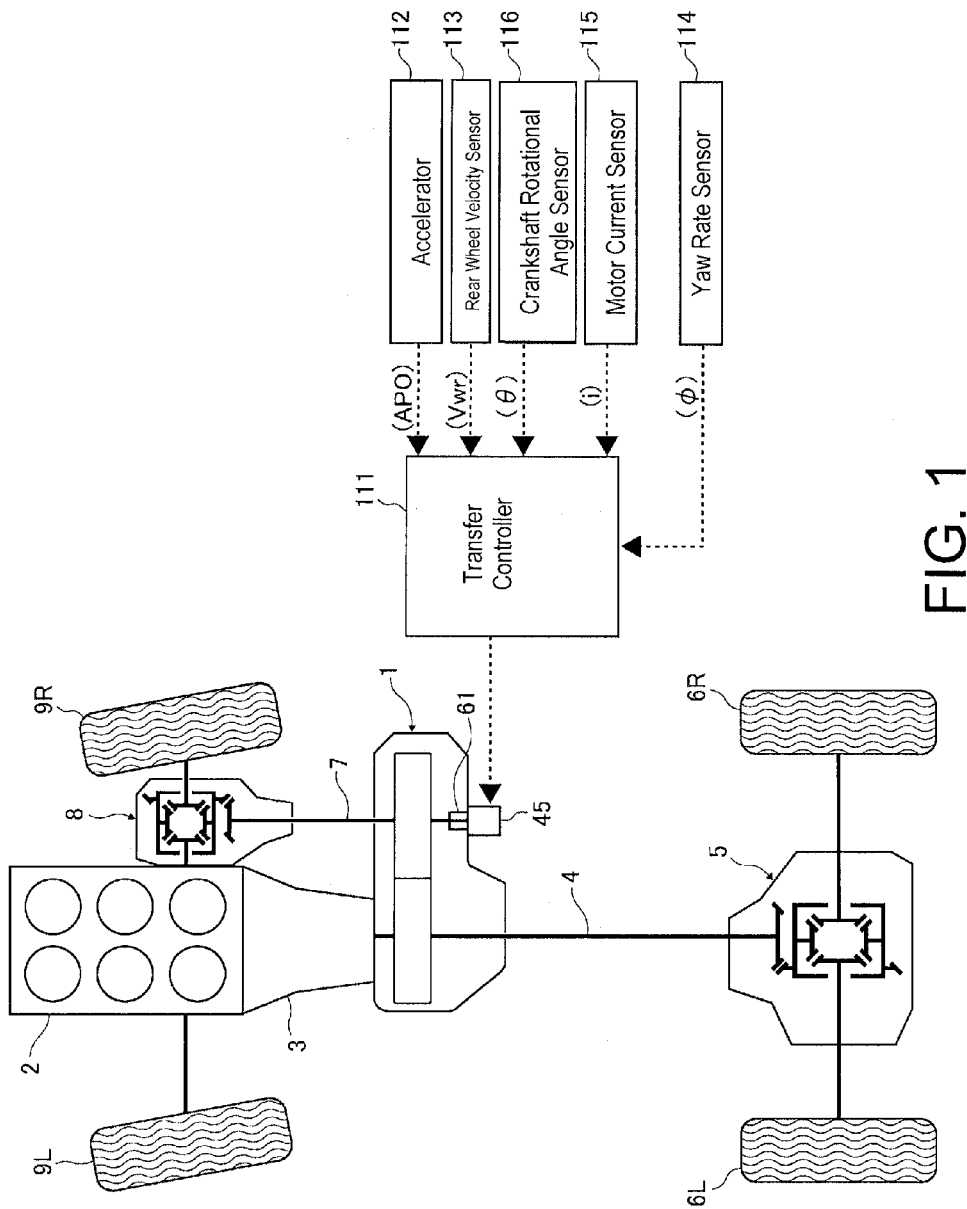
FIG. 1 is a schematic plane view from above the vehicle illustrating the power train of a four-wheel drive vehicle having a driving force distributor 1, which contains the unlocking controller of the irreversible rotary transmission system related to Example 1 of the present invention, as a transmission unit.

FIG. 1 is a schematic plane view from above the vehicle illustrating the power train of a four-wheel drive vehicle having a driving force distributor 1, which contains the unlocking controller of the irreversible rotary transmission system related to Example 1 of the present invention, as a transmission unit.

As to be explained later, according to the present Example, the irreversible rotary transmission system is adopted as a driving force distribution control system of the driving force distributor 1.

The four-wheel drive vehicle shown in FIG. 1 is a vehicle based on a rear wheel driving vehicle, wherein, after the rotation of the engine 2 has the speed changed by the transmission unit 3, the rotation goes sequentially through the rear propeller shaft 4 and the rear final drive unit 5 and is transmitted to the left/right rear wheels 6L and 6R.

By the driving force distributor 1, a portion of the torque to the left/right rear wheels (the master driving wheels) 6L and 6R is sent sequentially through the front propeller 7 and the front final drive unit 8 to the left/right front wheels (the slave driving wheels) 9L and 9R, so that the vehicle can operate in four-wheel drive mode.

By distributing and outputting a portion of the torque to the left/right rear wheels (the master driving wheels) 6L and 6R to the left/right front wheels (the slave driving wheels) 9L and 9R, the driving force distributor 1 determines the driving force distribution ratio between the left/right rear wheels (the master driving wheels) 6L and 6R and the left/right front wheels (the slave driving wheels) 9L and 9R. According to the present Example, this driving force distributor 1 has a configuration shown in FIG. 2.

Figure 2:
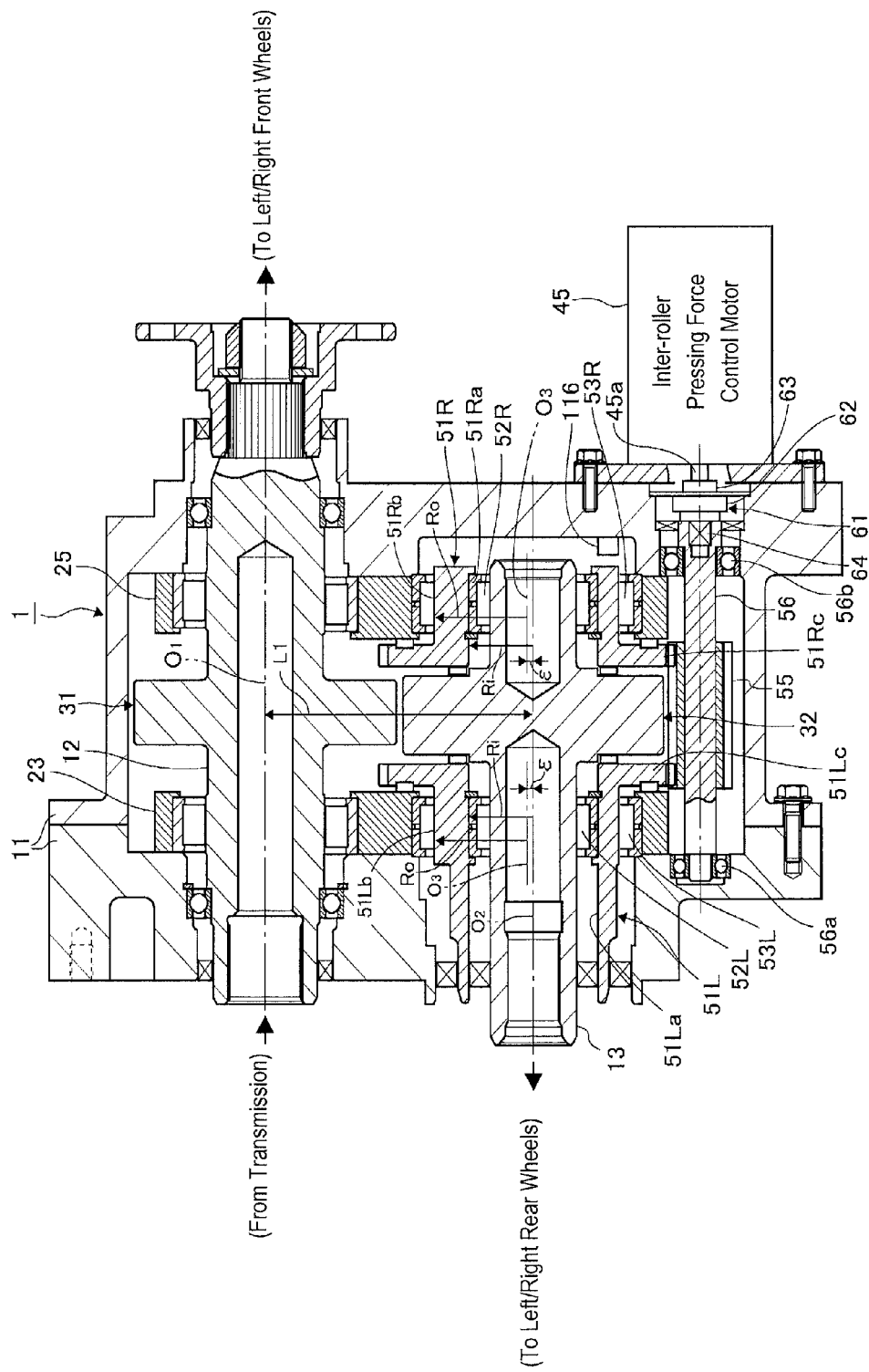
FIG. 2 is a vertical side cross-sectional view illustrating the driving force distributor shown in FIG. 1.

As shown in FIG. 2, 11 represents a housing. In this housing 11, a principal shaft 12 and a secondary shaft 13 are arranged with their rotating axes $O_1$ and $O_2$ parallel with each other, and they are laterally supported in a freely rotatable way.

The two ends of the principal shaft 12 protrude out from the housing 11, respectively. As shown in FIG. 2, the left end of the principal shaft 12 is engaged with the output shaft of the transmission unit 3 (see FIG. 1), and the right end of the principal shaft is engaged with the rear final drive unit 5 via the rear propeller shaft 4 (see FIG. 1).

At the middle portion in the axial direction of the principal shaft 12, the first roller 31 is formed monolithically in a concentric configuration. At the middle portion in the axial direction of the secondary shaft 13, the second roller 32 is formed monolithically in a concentric configuration. These first roller 31 and second roller 32 are arranged in a common plane perpendicular to the axis.

The secondary shaft 13 is supported indirectly on the housing 11 in a freely rotatable way via the bearing supports 23 and 25 that are hung on the two sides in the axial direction of the first roller 31 so that they can make relative rotation with respect to the principal shaft 12, with the following configuration.

In this configuration, hollow crankshafts 51L and 51R, which are arranged on the two sides in the axial direction of the second roller 32 formed monolithically at the middle portion in the axial direction of the secondary shaft 13, are loosely fit on the two end portions of the secondary shaft 13, respectively.

In the loosely fit portions between the central holes 51La and 51Ra (with the radius Ri as shown in the figure) of the crankshafts 51L and 51R and the two end portions of the secondary shaft 13, the secondary shaft 13 is supported via the bearings 52L and 52R in the central holes 51La and 51Ra of the crankshafts 51L and 51R so that the secondary shaft can rotate freely around their central axis $O_2$.

Figure 3:
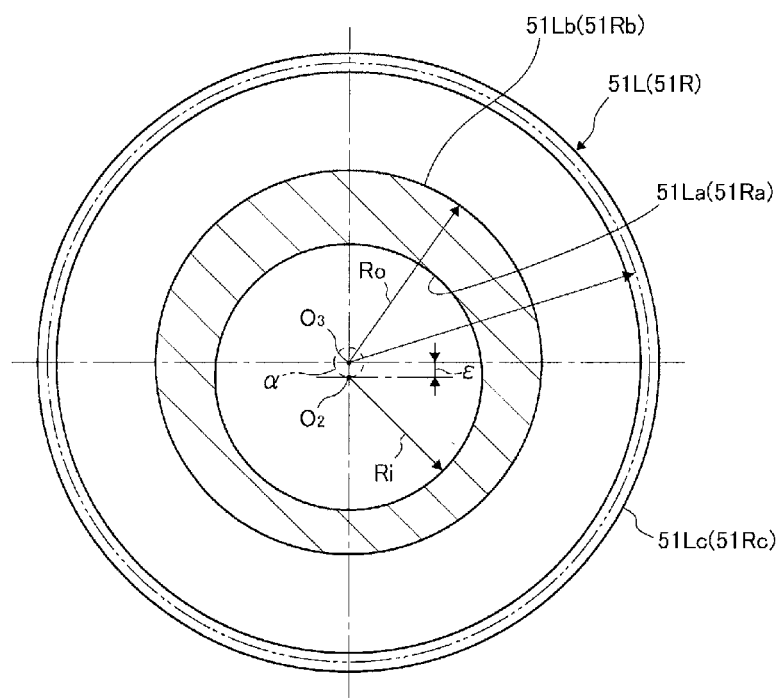
FIG. 3 is a vertical front cross-sectional view illustrating the crankshaft adopted in the driving force distributor shown in FIG. 2.

As shown in FIG. 3, on the crankshafts 51L and 51R, the outer peripheral portions 51Lb and 51Rb (with the radius of Ro as shown in the figure) are set with respect to the central holes 51La and 51Ra (central axis $O_2$). The central axis $O_3$ of these eccentric outer peripheral portions 51Lb and 51Rb is offset from the central axis $O_2$ of the central holes 51La and 51Ra (the rotating axis of the second roller 32) by the eccentricity s between the two.

As shown in FIG. 2, the eccentric outer peripheral portions 51Lb and 51Rb of the crankshafts 51L and 51R are supported in the bearing supports 23 and 25 on the corresponding sides via the bearings 53L and 53R in a freely rotatable way.

The crankshaft 51L and the secondary shaft 13 protrude out from the housing 11 on the left end shown in FIG. 2, respectively. The left end of the crankshaft 51L protruding out from the housing 11 is engaged with the left/right front wheels 9L and 9R via the front propeller 7 (see FIG. 1) and the front final drive unit 8.

As shown in FIG. 2, on the adjacent ends of the crankshafts 51L and 51R facing each other, the ring gears 51Lc and 51Rc with the same specifications are arranged monolithically and concentric to the eccentric outer peripheral portions 51Lb and 51Rb, respectively. These ring gears 51Lc and 51Rc are engaged with the common crankshaft driving pinion 55.

For this engagement, in the state in which the crankshafts 51L and 51R are set in the rotational position with their eccentric outer peripheral portions 51Lb and 51Rb aligned with each other in the circumferential direction, the crankshaft driving pinion 55 is engaged with the ring gears 51Lc and 51Rc.

The crankshaft driving pinion 55 is engaged with the pinion shaft 56, and the two ends of the pinion shaft 56 are supported via the bearings 56a and 56b on the housing 11 in a freely rotatable way, respectively. The right end of the pinion shaft 56 on the right hand side of FIG. 2 goes through the housing 11 and protrudes out from the housing. The exposed end portion of the pinion shaft 56 is engaged for driving with the motor shaft 45a of the inter-roller pressing force control motor 45 via a torque diode 61 as an irreversible rotation transmission element.

When the inter-roller pressing force control motor 45 enacts control of the rotation positions for the crankshafts 51L and 51R via the torque diode 61, the crankshaft driving pinion 55 and the ring gears 51Lc and 51Rc, the rotating axis $O_2$ of the secondary shaft 13 and the second roller 32 rotates along the trajectory circle α indicated by broken line shown in FIG. 3.

Figure 4:
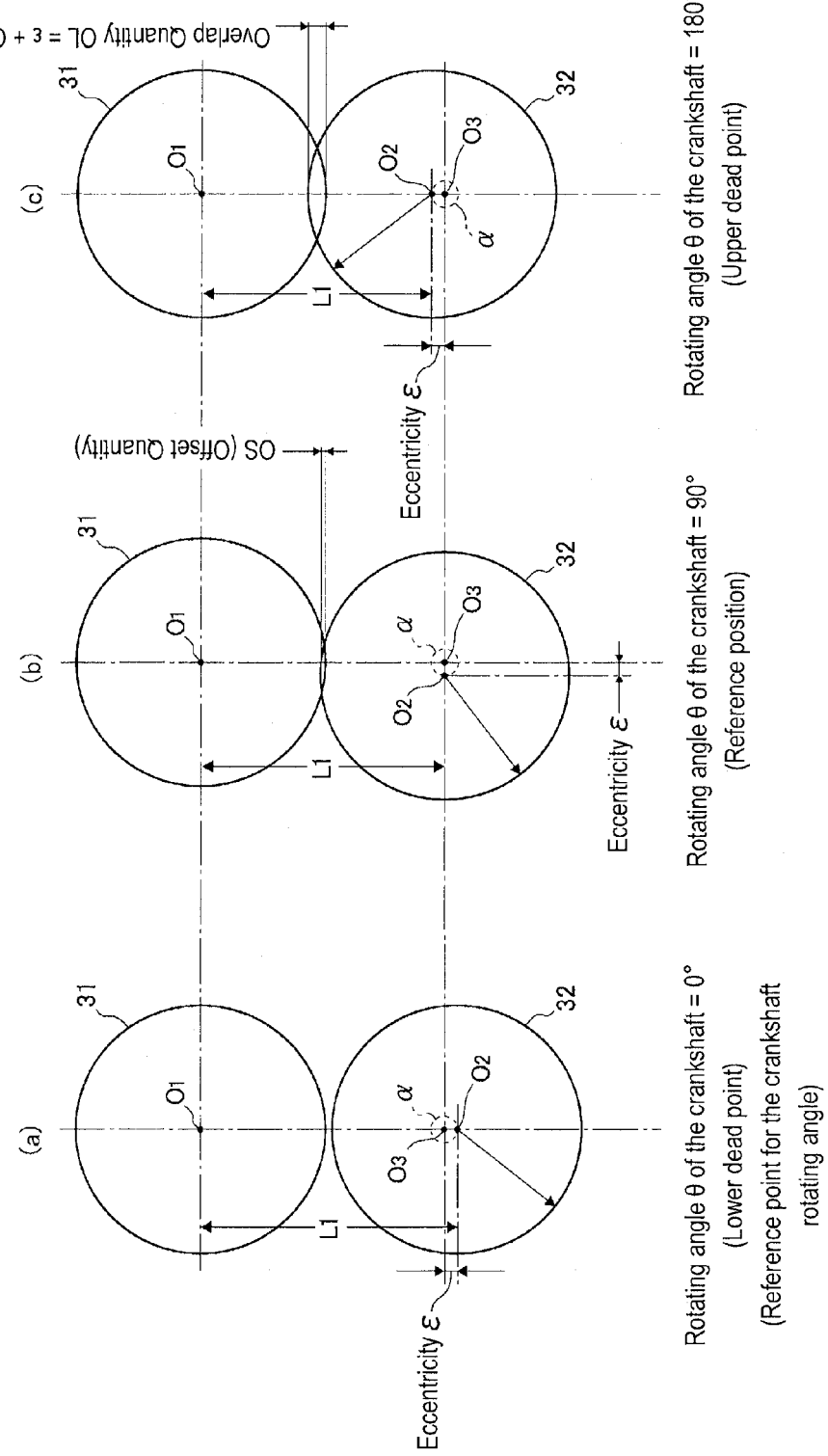
FIG. 4 illustrates the operation of the transmission shown in FIG. 2 with part (a) being a diagram illustrating the operation of the state in which the first roller and the second roller are separated from each other while the crankshaft rotational angle is at 0° as the reference point, part (b) being a diagram illustrating the operation of the state in which the first roller and the second roller are in contact with each other while the crankshaft rotational angle is 90°, and part (c) being a diagram illustrating the operation of the state in which the first roller and the second roller are in contact with each other while the crankshaft rotational angle is 180°.

Due to rotation of the rotating axis $O_2$ along the trajectory circle α (the second roller 32) shown in FIG. 3, the second roller 32 approaches the first roller 31 in the radial direction as shown in FIG. 4. As the rotational angle θ of the crankshafts 51L and 51R is increased, the inter-roller-axis distance L1 (also see FIG. 2) between the first roller 31 and the second roller 32 can become smaller than the sum of the radius of the first roller 31 and the radius of the second roller 32.

As the inter-roller-axis distance L1 decreases, the pressing force (the inter-roller transmission torque capacity) in the radial direction of the second roller 32 on the first roller 31 increases, and it is possible to enact control at will for the inter-roller pressing force in the radial direction (the inter-roller transmission torque capacity) corresponding to the degree of the decrease in the inter-roller-axis distance L1.

As shown in part (a) of FIG. 4, according to the present Example, the inter-roller-axis distance L1 at the lower dead point where the rotating axis $O_2$ of the second roller is located right below the rotating axis $O_3$ of the crankshaft and the inter-roller-axis distance L1 of the first roller 31 and the second roller 32 becomes the maximum is larger than the sum of the radius of the first roller 31 and the radius of the second roller 32.

At the lower dead point where the rotational angle θ of the crankshaft is 0°, the first roller 31 and the second roller 32 are not pressed towards each other in the radial direction, and it is possible to realize the state with the traction transmission capacity equal to 0 without carrying out the traction transmission between the rollers 31 and 32.

The traction transmission capacity can be controlled to be any value between the value of 0 at the lower dead point and the maximum value obtained at the upper dead point) (θ=180°) as shown in part (c) of FIG. 4.

In the following, the present Example will be explained when the rotational angle reference point of the crankshafts 51L and 51R is at the lower dead point where the rotational angle θ of the crankshaft is 0°.

Figure 5:
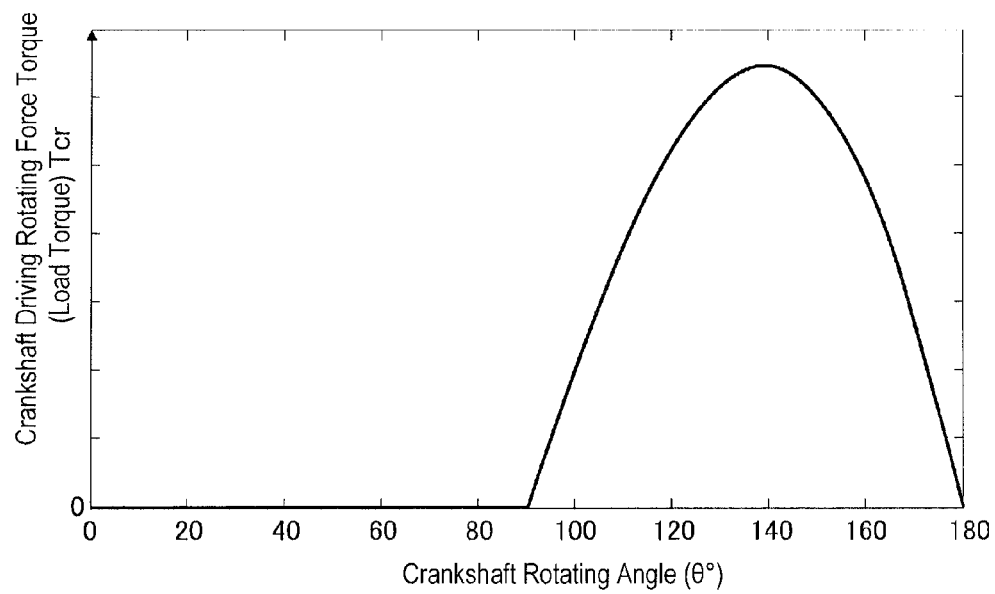
FIG. 5 is a line drawing illustrating the characteristics of variation in the crankshaft driving reactive force torque (the load torque) versus the crankshaft rotational angle of the driving force distributor shown in FIG. 2.

As to be explained later in detail, in the configuration of the transfer 1, the driving reactive force torque Tcr as shown in FIG. 5 acts on the crankshafts 51L and 51R corresponding to the rotational angle θ of the crankshaft.

As shown in FIG. 2, for the torque diode 61 included in the engagement section between the motor shaft 45a and the pinion shaft 56, irrelevant to the direction of the rotation operating force from the inter-roller pressing force control motor 45 (the motor shaft 45a), the transmission from the inter-roller pressing force control motor 45 (the motor shaft 45a) to the pinion shaft 56 can be carried out freely, while the reverse transmission from the pinion shaft 56 to the inter-roller pressing force control motor 45 (the motor shaft 45a) cannot be carried out by the two-way rotating lock of the pinion shaft 56. In the following, the configuration of the irreversible rotation transmission element described above will be explained with reference to FIG. 6 to FIG. 8.

Here, for the torque diode 61, the cylindrical case 62 is attached and anchored in the housing 11 as shown in FIG. 2.

Figure 6:
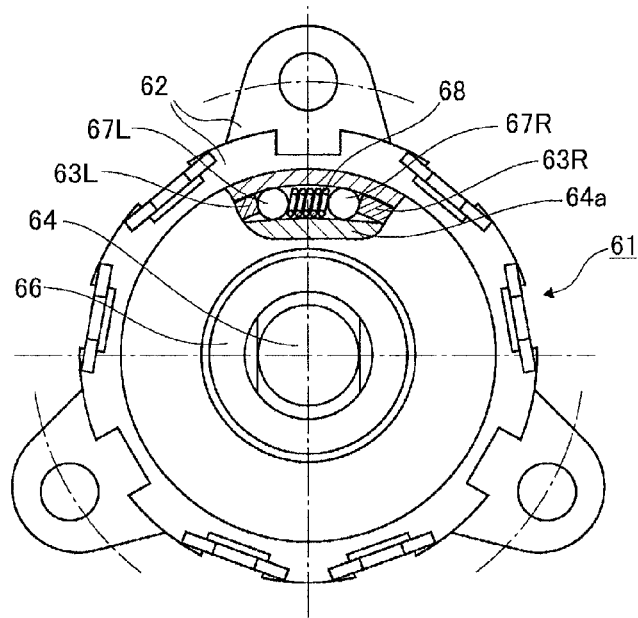
FIG. 6 is an end side view of the torque diode in the driving force distributor shown in FIG. 2 as viewed in the axial direction from the output shaft side.
Figure 7:
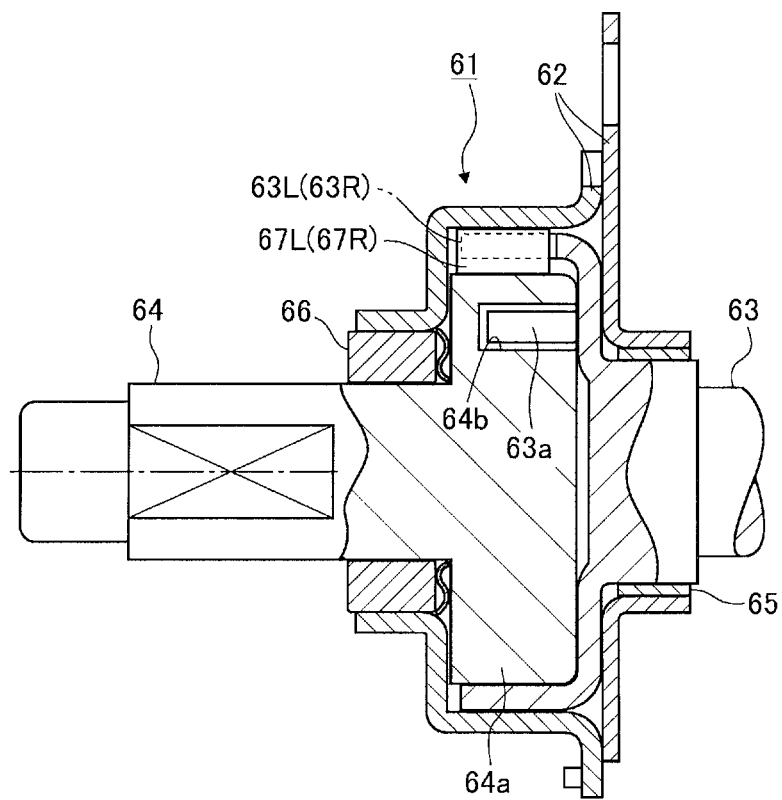
FIG. 7 is a vertical side view illustrating the torque diode shown in FIG. 4.

As shown in FIG. 6 and FIG. 7, the input shaft 63 enters from one side in the axial direction of the anchoring case 62, and the output shaft 64 enters from the other side in the axial direction into the anchoring case 62 such that they are arranged coaxially.

The input shaft 63 is supported in a freely rotatable way with respect to the anchoring case 62 by a bearing 65, and the output shaft 64 is supported in a freely rotatable way with respect to the anchoring case 62 by a bearing 66.

Figure 8:
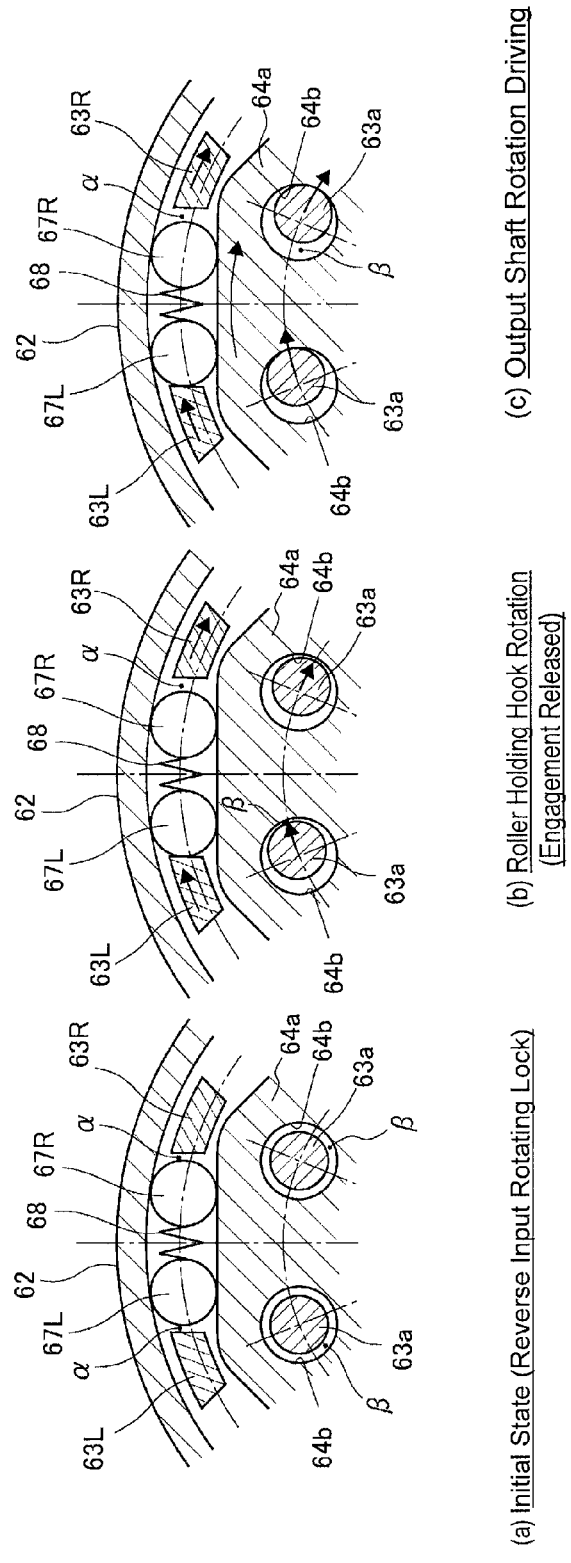
FIG. 8 illustrates the operation of the torque diode shown in FIG. 6 and FIG. 7, with part (a) being a diagram illustrating the irreversible rotation transmission operation of the torque diode in the state in which there is no input torque for controlling the driving force distribution, part (b) being a diagram illustrating the state right after the generation of the input torque for controlling the driving force distribution, and part (c) being a diagram illustrating the state at the start of the transmission of the input torque for controlling the driving force distribution to the output shaft.

As shown in FIG. 8, the entering end portion of the output shaft 64 in the anchoring case 62 becomes a hexagonal enlarged end portion 64a as viewed in the axial direction.

Between the outer peripheral flat faces as the edges of the hexagonal enlarged end portion 64a and the cylindrical inner peripheral surface of the anchoring case 62, a pair of the gripping rollers 67L and 67R as one group are included as they are arranged parallel with the axes of the input/output shafts 63 and 64.

As shown in FIG. 6 and FIG. 8, a spring 68 is included between these gripping rollers 67L and 67R, so that the gripping rollers 67L and 67R are energized away from each other.

As a result, as shown in FIG. 6 and part (a) of FIG., the gripping rollers 67L and 67R grip into the gap between the outer peripheral flat faces corresponding to the hexagonal enlarged end portion 64a and the cylindrical inner peripheral surface of the anchoring case 62, with the gap tapering smaller in the circumferential direction.

As shown in FIG. 6 and part (a) of FIG. 8, at the entering end portion of the input shaft 63 in the anchoring case 62, a pair of the gripping rollers 67L and 67R as one group is sandwiched from the two sides in the roller arrangement direction as the roller holding hooks 63L and 63R are arranged as a roller holder and located in the minimum gap in between the various corner portions of the hexagonal enlarged end portion 64a and the cylindrical inner peripheral surface of the anchoring case 62.

However, as indicated by α in part (a) of FIG. 6, a gap is normally present in between the roller holding hooks 63L and 63R and the gripping rollers 67L and 67R adjacent to them.

As shown in FIG. 7 and part (a) of FIG. 8, at the entering end portion of the input shaft 63 in the anchoring case 62, the plural driving pins 63a protruding out in the axial direction towards the hexagonal enlarged end portion 64a are arranged.

On the end surface of the hexagonal enlarged end portion 64a, the blind holes 64b are formed for loosely fitting the various driving pins 63a with a prescribed gap β in the radial direction (β>α).

As shown in FIG. 2, for the torque diode 61 with the configuration described above, the anchoring case 62 is anchored on the housing 11; the input shaft 63 is engaged with the motor shaft 45a of the inter-roller pressing force control motor 45; the output shaft 64 is engaged with the pinion shaft 56; and the structure is adopted for practical application of the driving force distributor 1.

In the following, the operation of the torque diode 61 will be explained below with reference to FIG. 8.

Part (a) of FIG. 8 shows the state in which no torque is input to the input shaft 63 from the motor 45 while the motor 45 shown in FIG. 2 is off.

In this case, the roller holding hooks 63L and 63R of the input shaft 63 are arranged at the central portion separated by gap α from the adjacent gripping rollers 67L and 67R, respectively, and the driving pins 53a of the input shaft 63 are located at the central portion of the blind holes 64b arranged on the output shaft 64 (the hexagonal enlarged end portion 64a).

In this state, even when there is a reverse input of the load torque described above, as shown in FIG. 5 from the output shaft 64 (the hexagonal enlarged end portion 64a), the output shaft 64 (the hexagonal enlarged end portion 64a) can stop rotation as follows.

When the reverse input from the output shaft 64 (the hexagonal enlarged end portion 64a) is a torque in the clockwise direction as shown in part (a) of FIG. 8, the corner portions on the delay side in the torque direction of the hexagonal enlarged end portion 64a work to have the roller 67L further gripped between them and the inner peripheral surface of the anchoring case 62, so that the rotation of the output shaft 64 (the hexagonal enlarged end portion 64a) caused by the reverse input is stopped.

When the reverse input from the output shaft 64 (the hexagonal enlarged end portion 64a) is a torque in the counterclockwise direction in part (a) of FIG. 8, the corner portions on the delay side in the torque direction of the hexagonal enlarged end portion 64a work to have the roller 67R further gripped between them and the inner peripheral surface of the anchoring case 62, so that rotation of the output shaft 64 (the hexagonal enlarged end portion 64a) caused by the reverse input is stopped.

Consequently, during the period when the torque is not input to the input shaft 63 due to the motor 45 not working, as shown in FIG. 2, the output shaft 64 (the hexagonal enlarged end portion 64a) is not rotated by the reverse input of the load torque in any of the directions described above, and the output shaft can be held at the current rotation position, so that the crankshafts 51L and 51R can be held at the current rotation position. Due to such irreversible rotation transmission operation, the pressing force in the radial direction between the rollers 31 and 32 (the inter-roller transmission torque capacity) due to the irreversible rotation transmission operation, that is, the current driving force distribution ratio, can be held as is.

However, as shown in FIG. 2, when the motor 45 works to input a torque to the input shaft 63, this torque is transmitted to the hexagonal enlarged end portion 64a (the output shaft 64) so that the torque is transmitted to the hexagonal enlarged end portion 64a (the output shaft 64) and to the drive force distribution control system so that the torque diode 61 assumes the state to be explained below.

In the following, an explanation will be made regarding the case in which the torque from the motor 45 to the input shaft 63 is in the direction indicated by the arrow shown in parts (b) and (c) of FIG. 8.

After the roller holding hook 63L on the delay side of the rotational direction of the input shaft 63 is rotated by the gap α, as shown in part (b) of FIG. 8, the roller holding hook hits and comes into contact with the corresponding roller 67L, and this roller 67L is pressed to move in the direction to approach the roller 67R against the spring 68; as shown in part (c) of FIG. 8, the displacement is made in the direction to increase the gap between the corresponding outer peripheral flat faces of the hexagonal enlarged end portion 64a and the inner peripheral surface of the anchoring case 62.

The roller 67R releases the rotation lock of the hexagonal enlarged end portion 64a (the output shaft 64) with respect to the anchoring case 62 by such displacement.

When the rotation lock is released, as shown in part (c) of FIG. 8, the driving pins 63a of the input shaft 63 are engaged with the inner peripheral surface of the blind holes 64b by the rotation of the gap β; via the engagement between the driving pins 63a and the blind holes 64b, the input shaft 63 has the torque transmitted to the hexagonal enlarged end portion 64a (the output shaft 64); by adjusting the torque (by controlling the torque of the motor 45), it is possible to control at will the pressing force in the radial direction between the rollers 31 and 32 (the inter-roller transmission torque capacity), that is, the driving force distribution ratio.

For the torque from the motor 45 to the input shaft 63, even when the torque is in the reverse direction as indicated by the arrow in parts (b) and (c) of FIG. 8, after the roller holding hook 63R on the delay side in the rotational direction of the input shaft 63 is rotated by gap α, the roller holding hook hits and comes into contact with the corresponding roller 67R, so that the roller 67R is pressed to move, and the rotation lock is released.

In this case, the torque is transmitted to the hexagonal enlarged end portion 64a (the output shaft 64) via the engagement of the driving pins 63a of the input shaft 63 with the blind holes 64b, so that the pressing force in the radial direction between the rollers 31 and 32 (the inter-roller transmission torque capacity), that is, the driving force distribution ratio, can be controlled at will by adjusting the corresponding torque.

In the following, the driving force distribution operation of the driving force distributor 1 as described above will be explained with reference to FIG. 1 to FIG. 4.

On one hand, the torque reaching the principal shaft 12 of the driving force distributor 1 from the transmission unit 3 (see FIG. 1) is transmitted from the principal shaft 12 as through the rear propeller shaft 4 and the rear final drive unit 5 (see FIG. 1) to the left/right rear wheels 6L and 6R (the master driving wheels).

On the other hand, for the driving force distributor 1, by the motor 45, the crankshafts 51L and 51R are controlled for the rotational position via the crankshaft driving pinion 55 and the ring gears 51Lc and 51Rc; when the inter-roller-axis distance L1 is smaller than the sum of the radii of the first roller 31 and the second roller 32, as these rollers 31 and 32 have an inter-roller transmission torque capacity corresponding to the pressing force in the radial direction between them corresponding to this torque capacity, a portion of the torque applied to the left/right rear wheels 6L and 6R (the master driving wheels) is sent from the first roller 31 via the second roller 32 to the secondary shaft 13, so that the left/right front wheels 9L and 9R (the slave driving wheels) also can be driven.

As a result, the vehicle can operate in four-wheel drive mode, as all of the left/right rear wheels 6L and 6R (the master driving wheels) and the left/right front wheels 9L and 9R (the slave driving wheels) drive.

The pressing reactive force Ft in the radial direction between the first roller 31 and the second roller 32 during the transmission is received and stopped by the bearing supports 23 and 25 as the rotating supporting plates common for them, and the pressing reactive force cannot reach the housing 11.

The pressing reactive force Ft in the radial direction is 0 when the rotational angle of the crankshaft is in the range of 0° to 90°; the pressing reactive force then increases as the θ increases when the rotational angle θ of the crankshaft is in the range of 90° to 180°, and the pressing reactive force becomes the maximum value when the rotational angle θ of the crankshaft is 180°.

Due such pressing reactive force Ft in the radial direction, on the crankshafts 51L and 51R, the driving reactive force torque Tcr (the load torque) represented by the following formula acts.

$$Tcr = Ft \times R0 \times \sin\theta$$

As can be seen from this formula, the driving reactive force torque Tcr (the load torque) displays nonlinear characteristics with respect to the rotational angle θ of the crankshaft as shown in FIG. 5.

As shown in part (b) of FIG. 4, during the four-wheel drive mode, when the rotational angle θ of the crankshafts 51L and 51R is of 90° of the reference position, and the first roller 31 and the second roller 32 make frictional contact with each other as they are pressed together by the pressing force in the radial direction corresponding to the offset quantity OS in this case, the power transmission is carried out to the left/right front wheels 9L and 9R (the slave driving wheels) at the traction transmission capacity corresponding to the offset quantity OS between the rollers.

As the rotation operation is carried out for the crankshafts 51L and 51R from the reference position shown in part (b) of FIG. 4, to increase the rotational angle θ of the crankshaft towards the upper dead point of θ equals 180° shown in part (c) of FIG. 4, the inter-roller-axis distance L1 decreases, and the overlap quantity OL between the first roller 31 and the second roller 32 increases. As a result, the pressing force in the radial direction between the first roller 31 and the second roller 32 increases, so that it is possible to increase the traction transmission capacity between these rollers.

When the crankshafts 51L and 51R reach the upper dead point position shown in part (c) of FIG. 4, the first roller 31 and the second roller 32 are pressed to each other in the radial direction under the maximum pressing force in the radial direction corresponding to the maximum overlap quantity OL, so that it is possible to maximize the traction transmission capacity between them.

The maximum overlap quantity OL is the sum of the eccentricity ε between the rotating axis $O_2$ of the second roller and the rotating axis $O_3$ of the crankshaft and the offset quantity OS between the rollers as shown in part (b) of FIG. 4.

As can be seen from the above explanation, by the operation of the rotation of the crankshafts 51L and 51R from the rotational position corresponding to the rotational angle θ of the crankshaft is equal to 0° to the rotational position corresponding to the rotational angle θ of the crankshaft is equal to 180°, as the rotational angle θ of the crankshaft increases, it is possible to continuously change the inter-roller traction transmission capacity from 0 to the maximum value.

On the contrary, by the rotation operation of the crankshafts 51L and 51R from the rotational position corresponding to the rotational angle θ of the crankshaft equal to 180° to the rotational position corresponding to the rotational angle θ of the crankshaft equal to 0°, as the rotational angle θ of the crankshaft is decreased, it is possible to continuously change the inter-roller traction transmission capacity from the maximum value to the 0. As a result, the inter-roller traction transmission capacity can be controlled at will by carrying out the operation for the rotation of the crankshafts 51L and 51R.

During the four-wheel drive mode, for the transfer unit 1, as explained above, a portion of the torque sent to the left/right rear wheels (the master driving wheels) 6L and 6R is distributed to the left/right front wheels (the slave driving wheels) 9L and 9R and is output. Consequently, the traction transmission capacity between the first roller 31 and the second roller 32 should correspond to the target front wheel drive force that should be distributed to the left/right front wheels (the slave driving wheels) 9L and 9R and determined from the drive force of the left/right rear wheels (the master driving wheels) 6L and 6R and the target driving force distribution ratio for the front/rear wheels.

In this Example, in order to control the traction transmission capacity to meet such a requirement, as shown in FIG. 1, a transfer controller 111 is arranged; by this transfer controller, it is possible to carry out the rotation control of the motor 45 (the control of the rotational angle θ of the crankshaft).

For this purpose, the following signals are input to the transfer controller 111: the signal from the accelerator position sensor 112 that detects the accelerator pedal step-down quantity (accelerator position) AP0 for adjusting the output of the engine 2; the signal from the rear wheel velocity sensor 113 that detects the rotating circumferential velocity Vwr of the left/right rear wheels (the master driving wheels) 6L and 6R; the signal from the yaw rate sensor 114 that detects the yaw rate φ on the periphery of the vertical axis passing through the center of gravity of the vehicle; the signal from the motor current sensor 115 that detects the current i from the transfer controller 111 to the motor 45; and the signal from the crankshaft rotational angle sensor 116 that detects the rotational angle θ of the crankshafts 51L and 51R arranged in the housing 11 as shown in FIG. 2.

Figure 9:
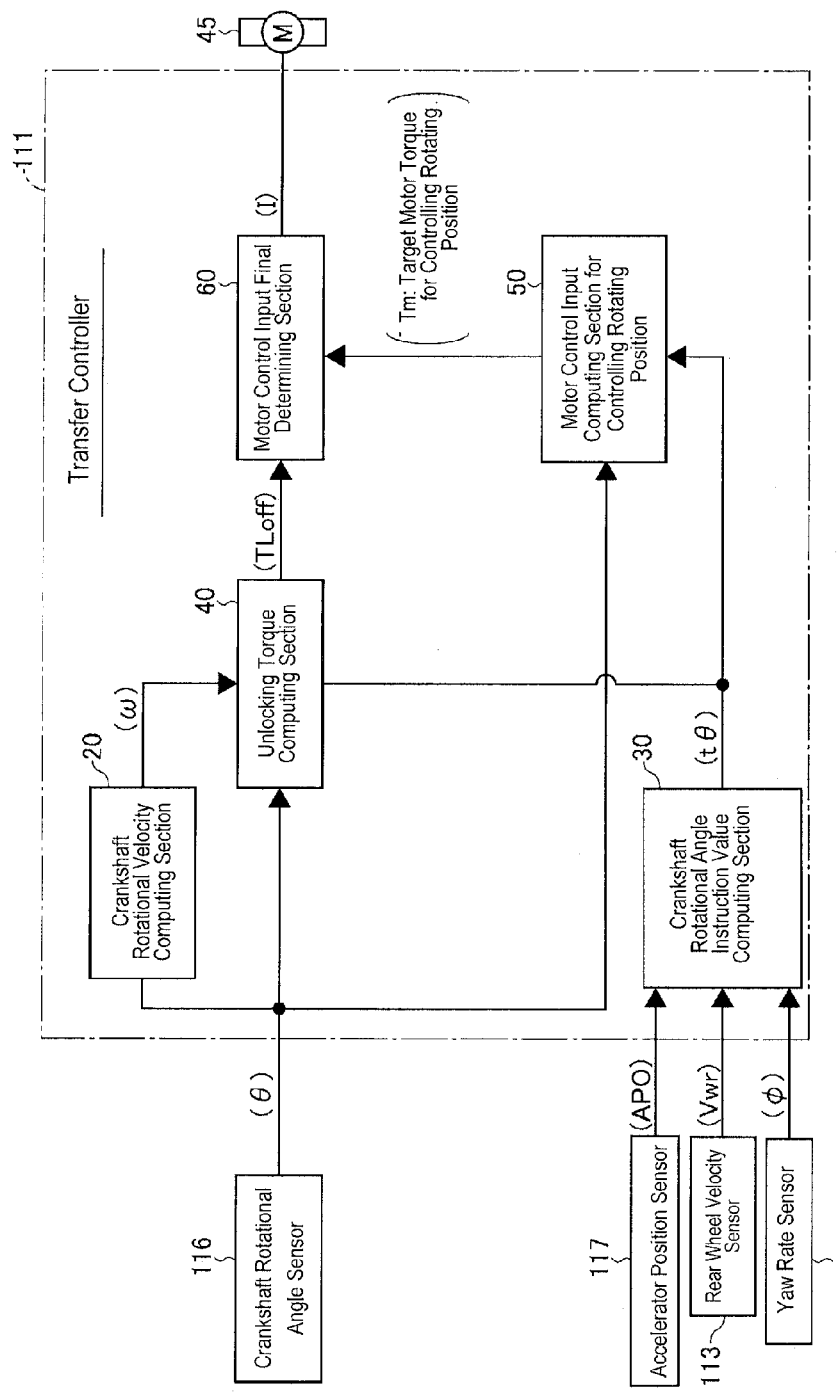
FIG. 9 is a block diagram illustrating the functions of the transmission controller shown in FIG. 1.

The transfer controller 111 has the structure shown in FIG. 9, a function block drawing, and the transfer controller is for controlling the traction transmission capacity.

The transfer controller has the crankshaft rotational velocity computing part 20; the crankshaft rotational angle instruction value computing section 30; the unlocking torque computing section 40 as the main section of the present invention; the motor control input computing section 50 for controlling the rotational position; and the motor control input final determining section 60.

The crankshaft rotational velocity computing part 20 computes the crankshaft rotational velocity ω on the basis of the rotational angle θ of the crankshaft detected by the crankshaft rotational angle sensor 116.

This computing operation can be carried out using any of the well-known methods, such as the method whereby the difference between the current-round detected rotational angle θ of the crankshaft and the rotational angle of the crankshaft detected one control period ago is divided by the control period to determine the crankshaft rotational velocity ω, or the method whereby the detected rotational angle θ of the crankshaft is fed through a band-pass filter to determine the crankshaft rotational velocity ω.

The crankshaft rotational angle instruction value computing section 30 determines the crankshaft rotational angle instruction value tθ according to the well-known scheme from the accelerator position AP0 detected by the accelerator position sensor 112, the rear wheel velocity Vwr detected by the rear wheel velocity sensor 113, and the yaw rate φ detected by the yaw rate sensor 114.

The following is an example: the front/rear wheel target driving force distribution ratio and the current left/right rear wheel drive force are determined; from the front/rear wheel target driving force distribution ratio and the current left/right wheel drive force, the target front wheel drive force Tf that should be distributed to the left/right front wheels (the slave driving wheels) 9L and 9R is computed; the inter-roller pressing force Fr in the radial direction needed for transmitting the target front wheel drive force Tf by the first roller 31 and the second roller 32 is determined by map searching or the like; and then, on the basis of the motor operation characteristics map illustrating the relationship between the inter-roller pressing force Fr in the radial direction and the rotational angle θ of the crankshaft as the control output operation quantity of the motor 45, from the inter-roller pressing force Fr in the radial direction corresponding to the target front wheel drive force Tf described above, the crankshaft rotational angle instruction value tθ needed for getting the traction transmission capacity that can transmit the target front wheel drive force Tf is determined.

The unlocking torque computing section 40 has the rotational angle θ of the crankshaft, the crankshaft rotational velocity ω, and the crankshaft rotational angle instruction value tθ input into the unlocking torque computing section, and the unlocking torque computing section computes the unlocking torque TLoff of the torque diode 61 described above as follows.

In this computing, by comparing the detected current rotational angle θ of the crankshaft and the crankshaft rotational angle instruction value tθ, it is possible to determine the direction in which the motor 45 should rotate; on the basis of the map shown in FIG. 10, as an example and related to the unlocking torque TLoff needed for the lock release of the torque diode 61, determined experimentally beforehand and subject to learning control to be explained later as needed, the unlocking torque TLoff is determined from the rotational direction of the motor 45 and the rotational angle θ of the crankshaft.

Figure 10:
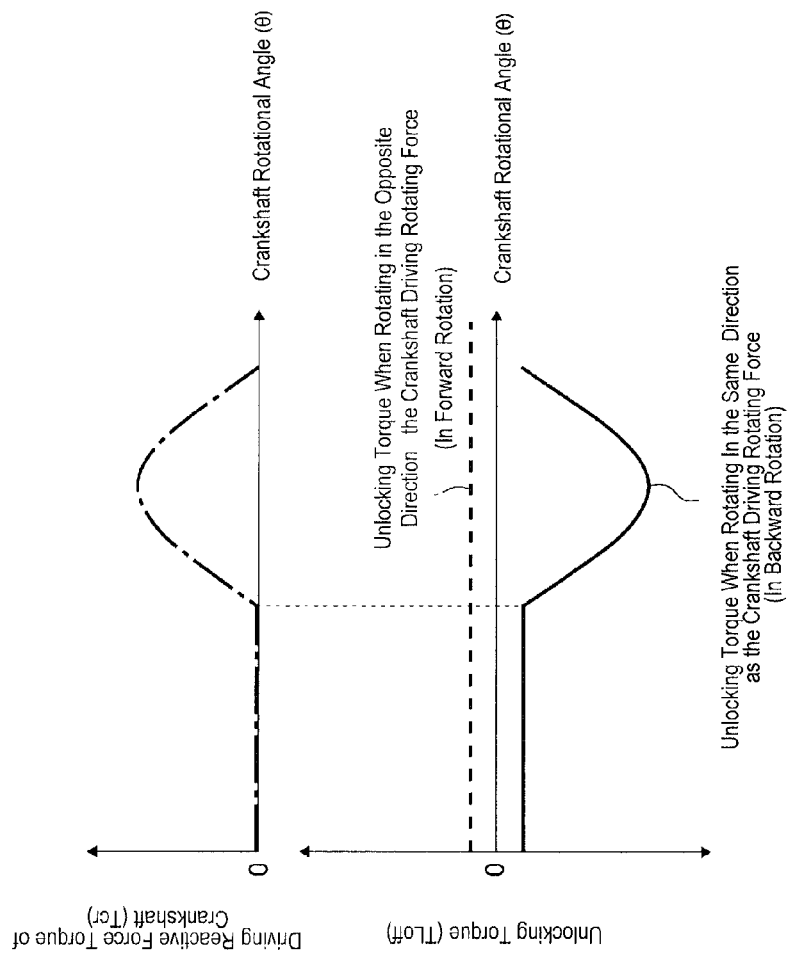
FIG. 10 is a line drawing illustrating the relationship between the crankshaft driving reactive force torque of the driving force distributor shown in FIG. 2 and the unlocking torque needed for releasing the lock for the torque diode against the rotational angle of the crankshaft.

As shown in FIG. 10, as described above, the unlocking torque TLoff has different values corresponding to the rotational direction of the motor 45 and the rotational angle θ of the crankshaft; the unlocking torque Tloff, when the motor rotates in the direction for decreasing the rotational angle θ of the crankshaft (in the backward rotation), that is, when the motor makes a backward rotation in the same direction as the driving reactive force torque Tcr (the load torque), is set larger than that when the motor rotates in the direction for increasing the rotational angle θ of the crankshaft (the forward rotation), that is, when the motor makes a forward rotation in the direction opposite to the driving reactive force torque Tcr (the load torque).

In addition, depending on whether the crankshaft rotational velocity ω is greater than the unlocking end determination rate (e.g., 1 rad/s), the unlocking torque computing section 40 determines whether the torque diode 61 is in the lock released state; when the unlocking torque computing section determines that the unlocking ends, the unlocking torque computing section determines the timing for end of the input of the unlocking torque TLoff (TLoff=0).

The motor control input computing section 50 for controlling the rotational position has the rotational angle θ of the crankshaft detected by the crankshaft rotational angle sensor 116 and the crankshaft rotational angle instruction value tθ determined by the crankshaft rotational angle instruction value computing section 30 as explained above input to the motor control input computing section; the motor control input computing section determines the target torque (the target motor torque for rotational position control) Tm of the motor 45 needed for having the rotational angle θ of the crankshaft to track the crankshaft rotational angle instruction value tθ with a prescribed response (e.g., with a time constant of 0.1 s) by the PID control or the nonlinear reactive force compensation or the like corresponding to the low-pass filter with a time constant of 0.1 s and the crankshaft rotational angle error (tθ−θ).

The motor control input final determining section 60 has the unlocking torque TLoff from the unlocking torque computing section 40 and the target motor torque Tm for controlling the rotational position from the motor control input computing section 50 input into the motor control input final determining section; during the normal control in the state in which the torque diode 61 is released, only the target motor torque Tm for controlling the rotational position alone is taken as the motor torque instruction value; however, before the torque diode 61 is released, corresponding to the unlocking direction (the rotational direction of the motor 45), a determination is made about whether the sum of the unlocking torque TLoff and the target motor torque Tm for controlling the rotational position is taken as the motor torque instruction value or whether the unlocking torque TLoff alone is taken as the motor torque instruction value; the motor driving current needed for realizing the final determined motor torque instruction value is fed as the motor current instruction value I to the motor 45.

The motor control input final determining section 60 makes the decision described above. When the unlocking direction (the rotational direction of the motor 45) is of the forward rotation opposite to the direction of the reactive force torque (the load torque) for the crankshafts 51L and 51R, the sum of the unlocking torque TLoff and the target motor torque Tm for controlling the rotational position is taken as the motor torque instruction value; when the unlocking direction (the rotational direction of the motor 45) is of the backward rotation in the direction that is the same as the direction of the reactive force torque (the load torque) for the crankshafts 51L and 51R, the unlocking torque TLoff alone is taken as the motor torque instruction value.

The motor 45 is driven by the motor driving current i with a prescribed response to the motor current instruction value I described above.

When the motor 45 is driven by such current i, with a prescribed response, the rotational angle θ of the crankshafts 51L and 51R is taken as the crankshaft rotational angle instruction value tθ; with the corresponding force, the first roller 31 and the second roller 32 are pressed in the radial direction to make contact with each other, and the traction transmission capacity between the rollers 31 and 32 is controlled to the traction transmission capacity so that the target front wheel drive force Tf described above goes to the left/right front wheels (the slave driving wheels) 9L and 9R.

In the following, the main points in determining the unlocking torque TLoff by the unlocking torque computing section 40 shown in FIG. 9 will be explained with reference to FIG. 11.

First of all, in step S1, the rotational angle θ of the crankshaft detected by the crankshaft rotational angle sensor 116 is read.

Then, in step S2, the rotational angle θ of the crankshaft read in step S1 is used to compute the crankshaft rotational velocity ω.

In this computing step of the operation, any of the following schemes may be adopted. According to one scheme, the difference between the current-round read value of the rotational angle θ of the crankshaft and the rotational angle of the crankshaft read one control period ago is divided by the control period to determine the crankshaft rotational velocity ω. According to another scheme, the rotational angle θ of the crankshaft is fed through a band-pass filter to determine the crankshaft rotational velocity ω.

In step S3, a determination is made regarding whether the rotational angle θ of the crankshaft is not in agreement with the crankshaft rotational angle instruction value tθ; thus, the motor 45 should be turned on to drive the rotational angle θ of the crankshaft towards the crankshaft rotational angle instruction value tθ.

If there is no need to turn on the motor 45 because θ equals tθ, there is no need to enact the lock release for the torque diode 61, so that, in step S5, the unlocking torque TLoff is set at 0.

On the other hand, if the determination is that θ does not equal tθ (and, thus, turning on the motor 45 is necessary), step S3 progresses to step S4, and a determination is made regarding whether the crankshaft rotational velocity ω is lower than the prescribed value (e.g., 1 rad/s) (not reaching the lock released state) for determining whether the lock has been released for the torque diode 61.

Consequently, step S4 corresponds to the operation of the unlocking end determination means according to the present invention.

If determination is made in step S3 that the motor should be turned on, yet determination is also made in step S4 that the crankshaft rotational velocity ω is greater than the prescribed value described above (the unlocking end determination value) (the lock released state), as the torque diode 61 is in the lock released state, there is no need to carry out the operation of the lock release for the torque diode 61, step S5 is the next step, and the unlocking torque TLoff is set at 0.

In step S4, if the state has not reached the lock released state as determination is made for the crankshaft rotational velocity ω, then the crankshaft rotational velocity ω<a prescribed value (1 rad/s) step S6 is the next step, and a determination is made regarding whether such a determination is made for the first round, that is, whether this is the initial round that there is a request for the lock release for the torque diode 61 in the locked state (the start of unlocking control).

If the state is found to be start of the unlocking control, step S7 is the next step, and the magnitude of the rotational angle θ of the crankshaft and that of the crankshaft rotational angle instruction value tθ are compared with each other; then, determination is made regarding the rotational direction of the crankshafts 51L and 51R and, thus, the unlocking direction of the torque diode 61.

In this determination, if the rotational angle θ of the crankshaft is found to be larger than the crankshaft rotational angle instruction value tθ, the crankshafts 51L and 51R are found to be in a backward rotation state, so that a determination can be made that there is a request for the lock release in the same direction as that of the crankshaft driving reactive force torque.

On the other hand, if the rotational angle θ of the crankshaft is found to be smaller than the crankshaft rotational angle instruction value tθ, the crankshafts 51L and 51R are determined to be in forward rotation, so that a determination can be made that there is a request for the lock release in the direction opposite to that of the crankshaft driving reactive force torque.

Consequently, step S7 corresponds to the operation of an input shaft rotational direction determination means in unlocking according to the present invention.

Figure 12:
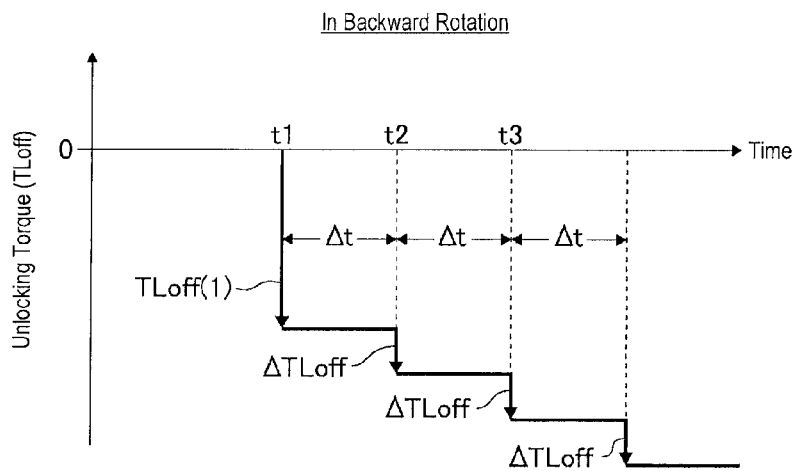
FIG. 12 is a time chart illustrating the main features of the increase in the unlocking torque by the control program shown in FIG. 11 when the unlocking of the torque diode by the initial set value of the unlocking torque has not ended.

In step S7, if determination is made that θ>tθ (i.e., the crankshafts 51L and 51R are in backward rotation, while unlocking is carried out in the same direction as that of the crankshaft driving reactive force torque), in step S8 corresponding to the operation of the unlocking torque setting means according to the present invention, on the basis of the map represented by the solid line in FIG. 10 described above, the backward rotation unlocking torque is determined from the rotational angle θ of the crankshaft, and the result is taken as the unlocking torque TLoff, as shown in FIG. 12, which shows as an example the case when TLoff(1) is determined at the unlocking control start time t1.

On the other hand, when a determination is made in step S7 that θ<tθ (i.e., the crankshafts 51L and 51R are in forward rotation, while unlocking is carried out in the direction opposite to that of the crankshaft driving reactive force torque), step S9 is the next step; on the basis of the map represented by the broken line in FIG. 10 described above, the forward rotation unlocking torque is determined from the rotational angle θ of the crankshaft, and the forward rotation unlocking torque is taken as the unlocking torque TLoff.

In step S8 or step S9, when the unlocking of the torque diode 61 by the unlocking torque TLoff of the initial round set as described above cannot end, and the fact that the unlocking of the torque diode 61 cannot end is determined in step S4 in the next round, that is, when the state without end of the unlocking keeps going, in step S6, control is enacted to go to step S10 and thereafter, and the unlocking torque TLoff is increased in the following operation.

First of all, in step S10, a determination is made regarding whether a prescribed time Δt (e.g., 100 ms) has lapsed from the last round of setting of the unlocking torque TLoff.

Until the prescribed time Δt has lapsed, in step S12, the unlocking torque TLoff is kept at the value of the last round. Once the prescribed time Δt has lapsed step S11 is the next step, and the unlocking torque TLoff is stepwise increased by the prescribed quantity of ΔTLoff from the value of the last round.

Consequently, the step S11 corresponds to the operation of the unlocking torque setting means according to the present invention.

In the following, the scheme for increasing the unlocking torque TLoff in steps of operation S10 to S12 will be explained in the case when the crankshafts 51L and 51R make a backward rotation. Here, for the unlocking torque TLoff, during the prescribed time Δt from the unlocking control start time t1, the torque is kept at the initial-round value TLoff(1) set in step S8; at the time point t2 when the prescribed time Δt has lapsed, the torque value is increased from TLoff(1) by the prescribed quantity of ΔTLoff; during the period from the time point t2 to the time point t3 when the prescribed time Δt has lapsed again, the torque is kept at the value of TLoff(1)+ΔTLoff; at the time point t3, the torque is further increased by the prescribed quantity ΔtLoff from the TLoff(1)+ΔTLoff.

When the unlocking of the torque diode 61 ends by the unlocking torque TLoff set as described above, in step S13 selected on the basis of the determination made in step S4, by the unlocking torque TLoff at the time when the unlocking can be made, the map represented by the broken line or the solid line in FIG. 10 is updated by learning; on the basis of the updated data, in the next round, the unlocking torque TLoff is determined in step S8 or step S9.

Consequently, the step S13 corresponds to the operation of the unlocking torque setting means according to the present invention.

In the following, the operation and effects of Example 1 described above will be explained in detail below with reference to FIG. 13 and FIG. 14.

Figure 13:
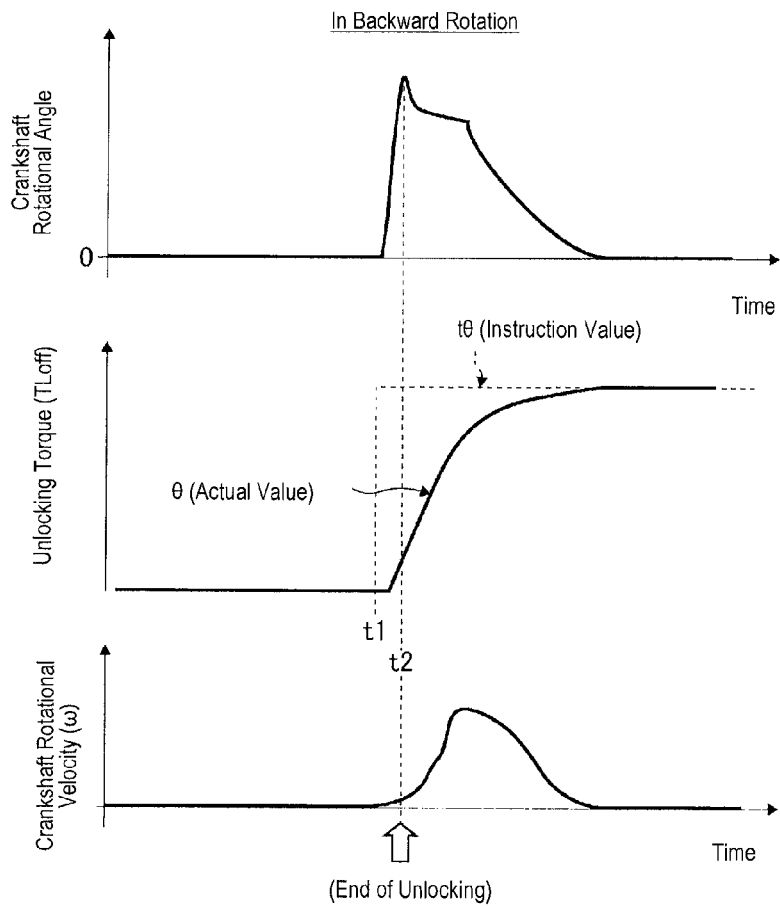
FIG. 13 is a time chart illustrating the operation when the crankshaft makes a forward rotation under the control of the transmission controller shown in FIG. 9.

FIG. 13 shows the time chart (the variation over time of the motor torque, the rotational angle θ of the crankshaft, and the crankshaft rotational velocity ω) in the case of the forward rotation in the direction opposite to the direction of the driving reactive force torque (the load torque) for the crankshafts 51L and 51R.

Figure 14:
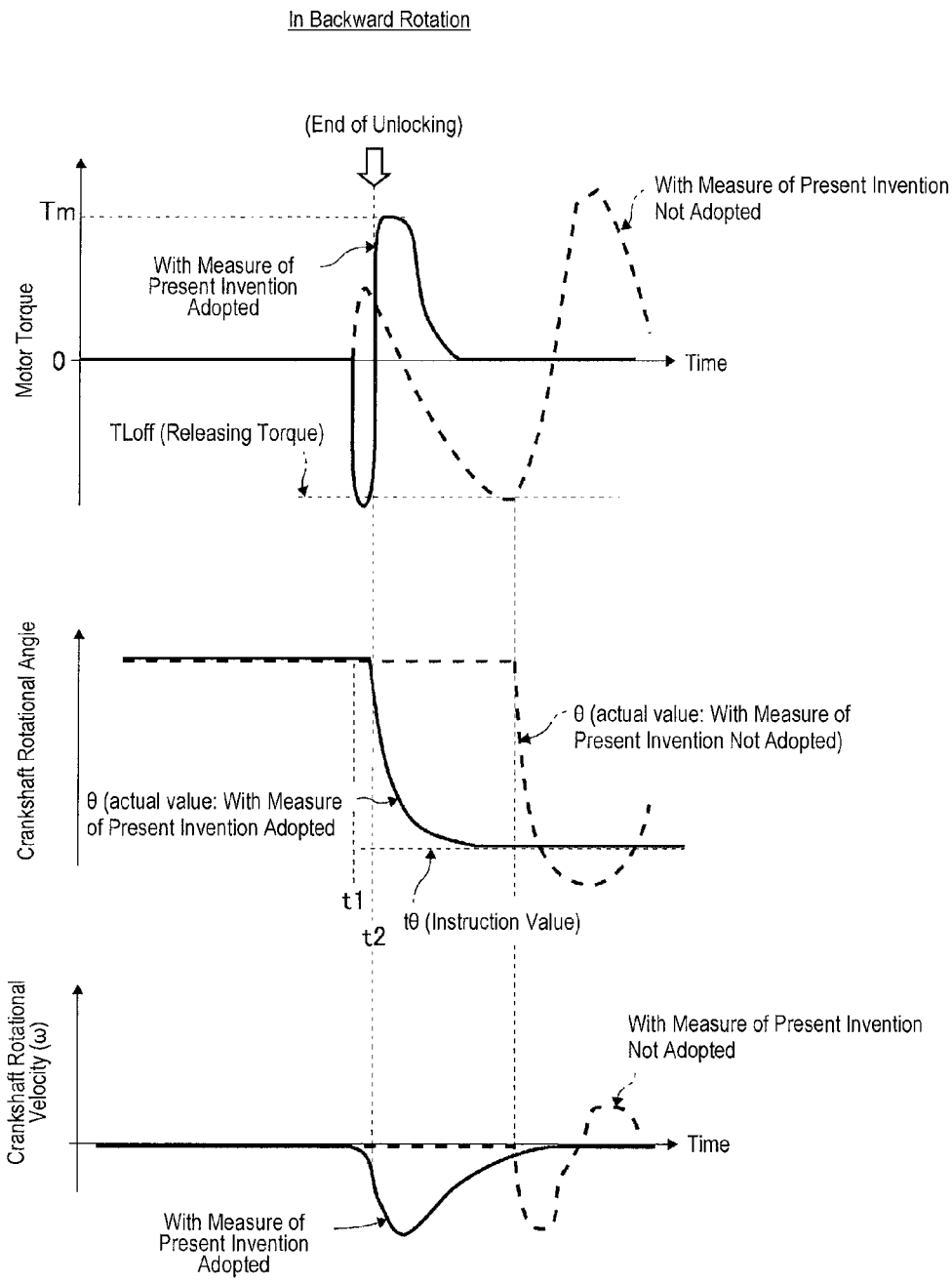
FIG. 14 is a time chart illustrating the operation when the crankshaft makes a backward rotation under the control of the transmission controller shown in FIG. 9.

FIG. 14 shows the time chart (the variation over time of the motor torque, the rotational angle θ of the crankshaft, and the crankshaft rotational velocity ω) in the case of the backward rotation in the direction that is the same as the direction of the driving reactive force torque (the load torque) for the crankshafts 51L and 51R.

In the following, an explanation will be made on the case when the crankshaft rotational angle instruction value tθ is changed stepwise as shown by the broken line at the time point t1 with the forward rotation as shown in FIG. 13.

As shown in FIG. 9, the motor control input final determining section 60 takes the sum of the target motor torque Tm for controlling the rotational position determined by the rotational position controlling motor control input computing section 50, as shown in the same figure, and the unlocking torque in the forward rotation (see the broken line shown in FIG. 10) determined by the unlocking torque computing section 40 shown in the same figure (step S9 in FIG. 11) from the current rotational angle θ of the crankshaft as the instruction value of the motor 45, and the motor torque is drastically increased in the period of the time point t1 to t2 as shown in FIG. 13.

As a result, the lock is released for the torque diode 61. Consequently, at the time point t2 when the crankshaft rotational velocity ω becomes greater than the prescribed value and the lock is released, in step S4 shown in FIG. 11, a determination is made that the unlocking ends, so that step S5 is the next step, and the unlocking torque TLoff is set at 0 under the control.

Consequently, after the time point t2 shown in FIG. 13, the motor control input final determining section 60 shown in FIG. 9 takes only the target motor torque Tm for controlling the rotational position and is the instruction value of the motor 45; the motor torque makes changes over time after the time point t2 as shown in FIG. 13, while the rotational angle θ of the crankshaft can be controlled to track the crankshaft rotational angle instruction value tθ with the response shown in FIG. 13.

In the backward rotation shown in FIG. 14, at the time point t1, the crankshaft rotational angle instruction value tθ is stepwise changed as indicated by the fine broken line. In the following, this case will be explained. In this case, if the measure of Example 1 is adopted, the following problems take place.

That is, when the measure of Example 1 is adopted, as indicated by the bold dashed line in FIG. 14, the unlocking torque and the target motor torque for controlling the rotational position interfere with each other, and it is impossible to carry out unlocking immediately. As a result, the output of the feedback compensator stays there waiting for reaching the unlocking torque. As a result, a delay in response takes place; as the output of the feedback compensator stays there, the responsiveness after the unlocking also degrades. This is undesirable.

On the other hand, according to Example 1, when the crankshaft rotational angle instruction value tθ makes a stepwise change as indicated by the fine broken line at time point t1, the motor control input final determining section 60 shown in FIG. 9 takes only the unlocking torque TLoff in the backward rotation determined from the current rotational angle θ of the crankshaft (see the solid line shown in FIG. 10) by the unlocking torque computing section 40 (step S8 in FIG. 11) shown in the same figure as the instruction value of the motor 45, and the motor torque makes the changes over time, as indicated by the solid line, in the period from the time point t1 to t2 as shown in FIG. 14.

By the unlocking torque TLoff in the backward rotation described above, the torque diode 61 releases the lock. As a result, when the crankshaft rotational velocity ω becomes greater than the prescribed value at the time point t2 as the end of unlocking, step S4 shown in FIG. 11 is the next step, and a determination is made that the unlocking ends, so that step S5 is the next step, and the unlocking torque TLoff is set to 0 under the control.

As a result, after the time point t2 shown in FIG. 14, the motor control input final determining section 60 shown in FIG. 9 takes only the target motor torque Tm for controlling the rotational position as the instruction value of the motor 45, and the motor torque makes changes over time as indicated by the solid line after time point t2 as shown in FIG. 14. Consequently, it is possible to enact control so that the rotational angle θ of the crankshaft can track the crankshaft rotational angle instruction value tθ with a high responsiveness indicated by the solid line in FIG. 14.

According to the present Example explained above, the magnitude of the unlocking torque TLoff (the solid line shown in FIG. 10) in the backward rotation when the rotational direction of the crankshafts 51L and 51R (the motor 45) is the same as the direction of the driving reactive force torque (the load torque) for the crankshafts 51L and 51R is larger than the unlocking torque TLoff (the broken line in FIG. 10) in the forward rotation when the rotational direction of the crankshafts 51L and 51R (motor 45) is opposite to the direction of the driving reactive force torque (the load torque) for the crankshafts 51L and 51R when the lock of the torque diode 61 is released. As a result, the following operation and effects can be realized.

When the rotational direction of the crankshafts 51L and 51R (the motor 45) when the lock is released is in the same direction as the driving reactive force torque (the load torque) of the crankshafts 51L and 51R, and unlocking is carried out for the torque diode 61 in the same direction as that of the driving reactive force torque (the load torque) applied on the crankshafts 51L and 51R, the roller 67L or roller 67R, which has the larger engagement gripping force under the influence of the high driving reactive force torque (the load torque) applied on the crankshafts 51L and 51R among the rollers 67L and 67R in the torque diode 61, is pressed in the unlocking direction so that lock is released for the torque diode 61.

According to Example 1, as explained above, in this case, the unlocking torque TLoff is higher. Consequently, even in the case of the backward rotation in the direction where the delay in the response of unlocking becomes a problem as explained above, it is still possible to maintain the prescribed unlocking response by means of the higher unlocking torque TLoff described above, so the problem related to the responsiveness in unlocking can be solved.

In addition, according to Example 1, when the unlocking torque TLoff is set in the backward rotation, a torque value with a magnitude large enough for unlocking and obtained beforehand, as shown by the solid line in FIG. 10 as an example, is taken as the unlocking torque TLoff. Consequently, it is possible to end the unlocking of the torque diode 61 by the unlocking torque TLoff in the backward rotation determined in step S8 shown in FIG. 11 in the initial round, and there is no need to increase the unlocking torque TLoff in the backward rotation in step S11 as shown in FIG. 12, so that the unlocking of the torque diode 61 can be carried out quicker; additionally, the responsiveness of the control in the rotational position of the crankshafts 51L and 51R can be improved after that, and, at the same time, the power consumption needed for unlocking of the torque diode 61 can be reduced.

Figure 11:
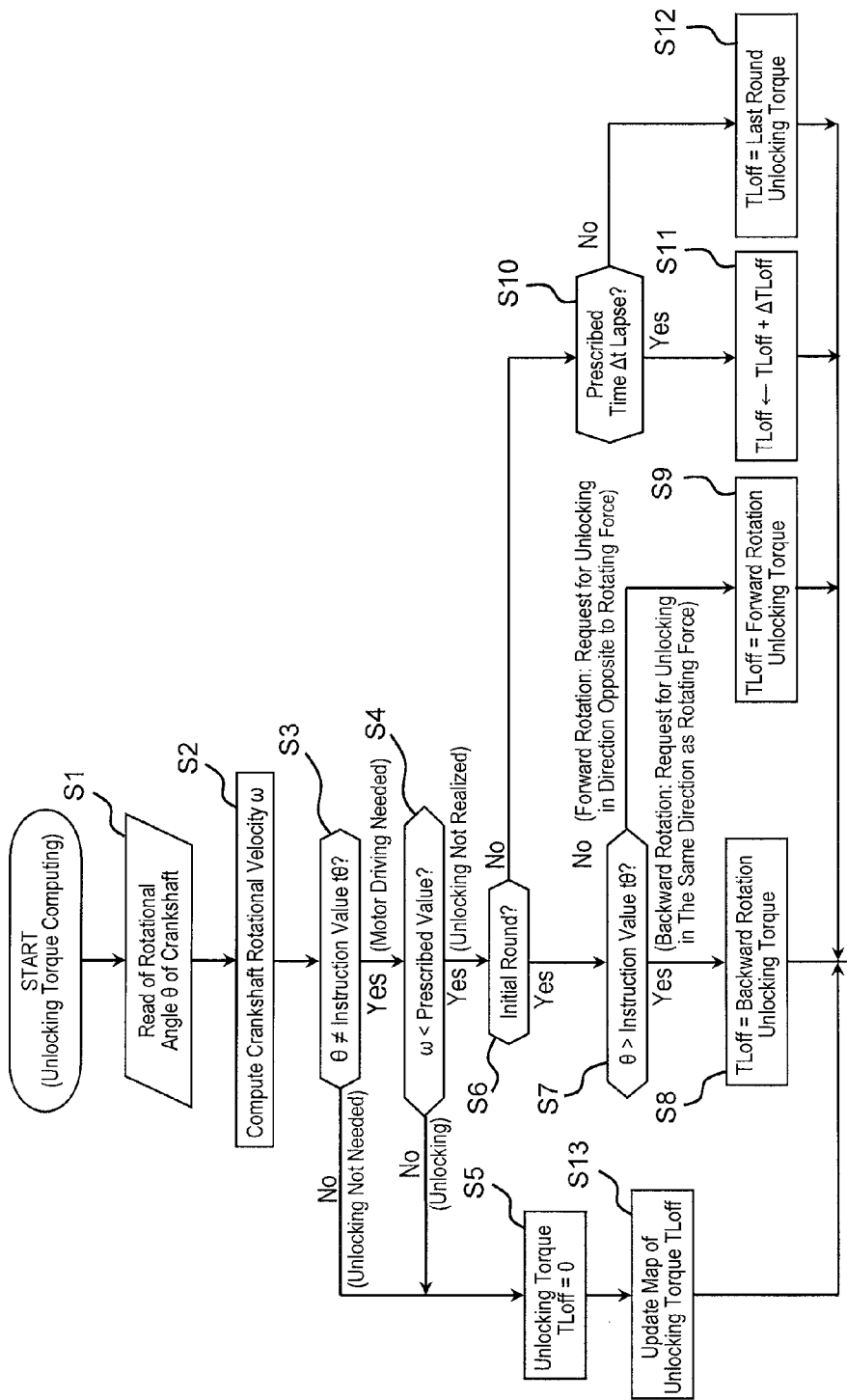
FIG. 11 is a flow chart illustrating the control program executed in computing the unlocking torque by the unlocking torque computing section shown in FIG. 9.

In addition, according to Example 1, the unlocking torque TLoff in backward rotation determined in step S8 shown in FIG. 11 in the initial round is kept being incremented in step S4 until the end of unlocking is determined for the torque diode 61 from the crankshaft rotational velocity ω. Consequently, it is possible to reliably end the unlocking for the torque diode 61.

On the other hand, when it is impossible to end the unlocking of the torque diode 61 by the unlocking torque TLoff in backward rotation set in the initial round, in step S4 shown in FIG. 11, this fact is determined from the crankshaft rotational velocity ω, and the unlocking torque TLoff in the backward rotation is gradually increased as shown in FIG. 12 in step S11 shown in the same figure until a determination has been made that the unlocking is ended; as a result, even when it is impossible to end the unlocking of the torque diode 61 by the unlocking torque TLoff in the backward rotation set in the initial round due to external disturbance or the dispersion in the unlocking torque TLoff, unlocking can still be guaranteed, so that the reliability is improved.

In addition, in this case, in step S13 shown in FIG. 11, the unlocking torque TLoff in the backward rotation that can ultimately end the unlocking of the torque diode 61 is learned and is stored by updating the map of the unlocking torque TLoff in the backward rotation represented by the solid line in FIG. 10; in the next round, the updated and stored unlocking torque TLoff in the backward rotation is put in the initial use, so that in the next round and thereafter, under the same condition, it is possible to end the unlocking of the torque diode 61 by the unlocking torque TLoff in the backward rotation determined in step S8 shown in FIG. 11 for the initial round, so that the unlocking of the torque diode 61 can be carried out quickly, and the response of the control for the rotational position of the crankshafts 51L and 51R after that can be improved; at the same time, the power consumption for the unlocking of the torque diode 61 can be cut.

Example 2

Figure 15:
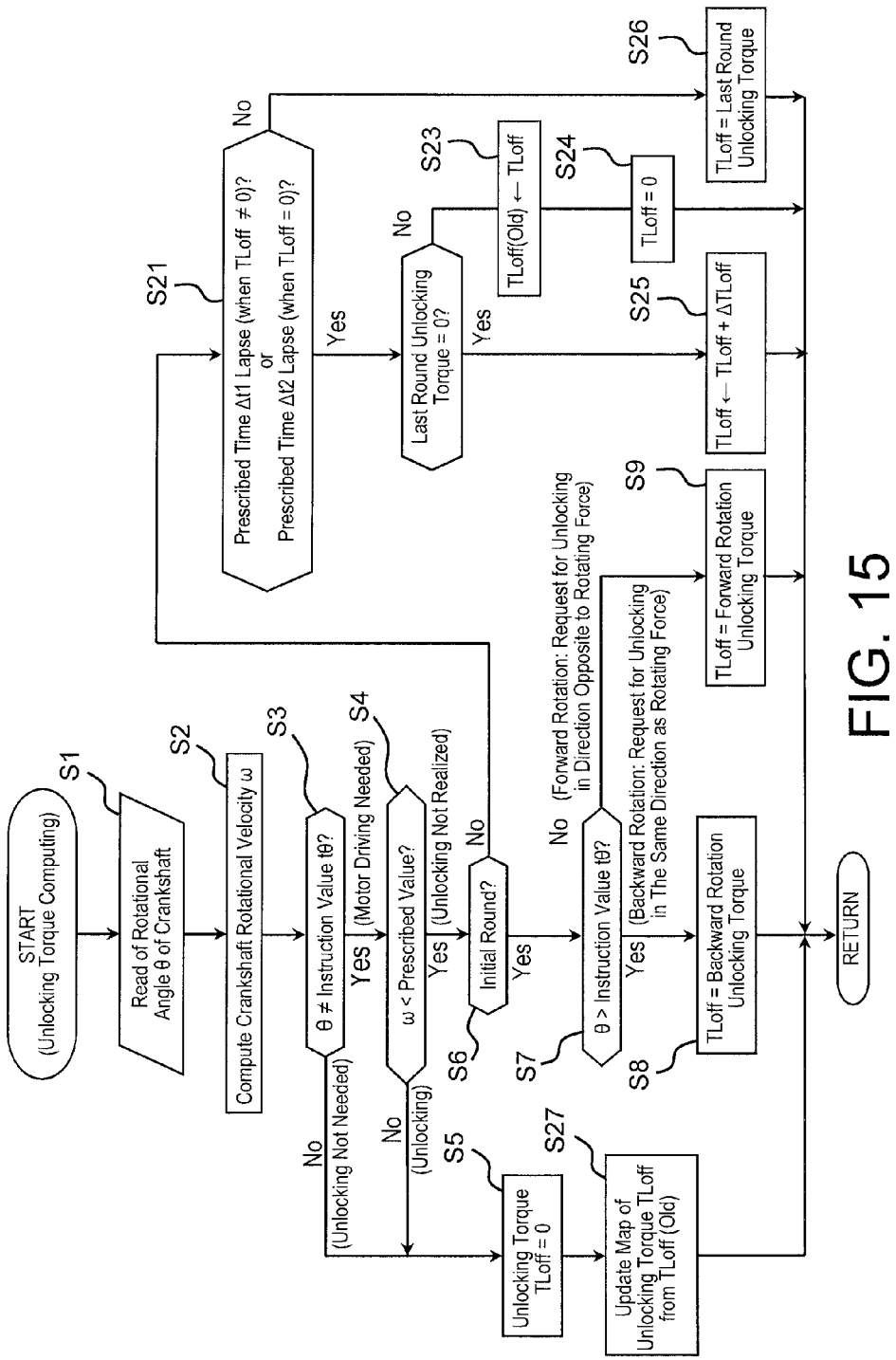
FIG. 15 is a flow chart illustrating the control program corresponding to FIG. 11.

FIG. 15 is a diagram illustrating the unlocking controller of the irreversible rotary transmission system related to Example 2 of the present invention. FIG. 15 shows the control program related to the unlocking torque computing process.

According to the present Example, the basic configuration is the same as that of the Example 1 described above with reference to FIG. 1 to FIG. 11. However, the present Example differs from Example 1 in that the unlocking torque computing section 40 shown in FIG. 9 executes the control program shown in FIG. 15 to compute the unlocking torque TLoff instead of the control program shown in FIG. 11.

In FIG. 15, the processes of the steps S1 to S9 are the same as steps of operation S1 to S9 in FIG. 11. On the other hand, in FIG. 15, the processes of the steps S21 to S27 are in place of the processes of the steps S10 to S13 shown in FIG. 11.

In step S8 or step S9, when the unlocking of the torque diode 61 by the unlocking torque TLoff of the initial round as described above cannot end, and this fact is determined in step S4 in the next round, that is, when the state without the end of unlocking by the unlocking torque TLoff of the initial round keeps going, in step S6, control is enacted to go to step S21 and thereafter, and the unlocking torque TLoff is increased as follows.

First of all, in step S21, a determination is made regarding whether a prescribed time Δt1 (the time when TLoff≠0, e.g., 100 ms) or a prescribed time Δt2 (the time when TLoff=0, a very short time shorter than 100 ms) has lapsed from the last round of setting of the unlocking torque TLoff.

For the first round, as TLoff does not equal 0, step S21 is the next step, and a determination is made on whether the prescribed time Δt1 has lapsed. Until the prescribed time Δt1 lapses, in step S26, the value of the last round is kept for the unlocking torque TLoff.

When a determination is made in step S21 that the prescribed time Δt1 has lapsed, step S22 is the next step, and a determination is made regarding whether the value of the last round of the unlocking torque TLoff is 0. If the value is not 0, in step S23, the value of the unlocking torque TLoff in the last round is set at TLoff(OLD), step S24 is the next step, and the unlocking torque TLoff is reset to 0.

In step S21, a determination is made regarding whether the prescribed time Δt2 has lapsed from the time when the unlocking torque TLoff is reset at 0. Until the lapse of the prescribed time Δt2, in step S26, the unlocking torque TLoff is kept at 0 as the value of the last round.

When a determination is made that the prescribed time Δt2 has lapsed in step S21, step S22 is the next step, and a determination is made regarding whether the value of the unlocking torque TLoff in the last round is 0. Now, as the value of the unlocking torque TLoff in the last round is 0, step S25 is the next step, and the unlocking torque TLoff is set at a value (TLoff(OLD)+ΔTLoff), that is, a value larger by a prescribed value of ΔTLoff than the value of TLoff(OLD) right before the reset of the unlocking torque TLoff stored in step S23.

In step S21, a determination is made regarding whether a prescribed time Δt1 has lapsed from the time of setting of the TLoff=(TLoff(OLD)+ΔTLoff). Until the prescribed time Δt1 has lapsed, the unlocking torque TLoff is kept at the value of the last round (TLoff(OLD)+ΔTLoff) in step S26.

When a determination is made in step S21 that the prescribed time Δt1 has lapsed, the loop of steps S22 to S24 is selected. In step S23, the value of the unlocking torque TLoff in the last round is set at TLoff(OLD), and then in step S24, the unlocking torque TLoff is reset at 0.

By repeatedly carrying out the control described above, the unlocking torque TLoff is kept at the set value of the initial round only by the prescribed time Δt1, and the unlocking torque is then rest at 0 for the prescribed time Δt2. Then, the unlocking torque is gradually increased such that the value that is larger than the value right before resetting by the prescribed value of ΔTLoff is kept only for a prescribed time Δt1.

Consequently, the processes of the steps S21 to S26 correspond to the operation of the unlocking torque setting means of the present invention.

In the following, with reference to FIG. 16, the state of the increase in the unlocking torque TLoff carried out in the processes of the steps S21 to S26 will be explained in the case of the backward rotation of the crankshafts 51L and 51R.

Figure 16:
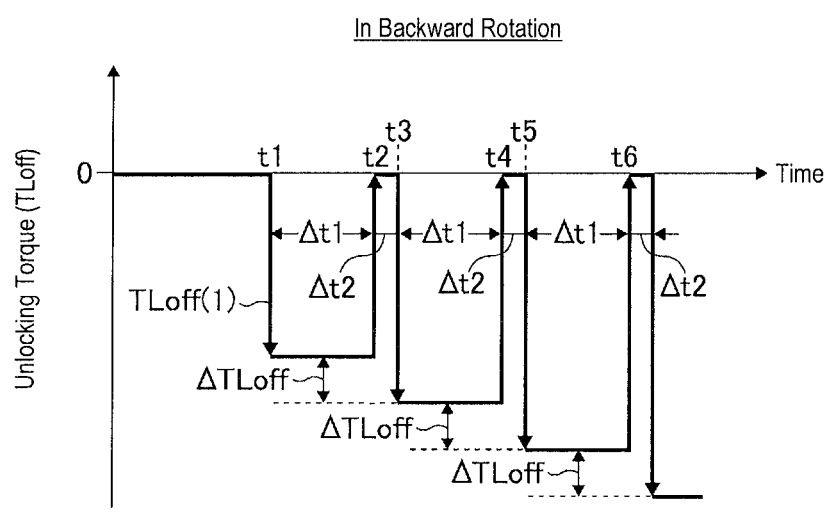
FIG. 16 is a time chart illustrating the main features when the unlocking torque is increased by the control program shown in FIG. 15 when the unlocking of the torque diode by the initial set value of the unlocking torque has not ended.

During a prescribed time Δt1 from the unlocking control start time t1 as shown in FIG. 16, the value of the unlocking torque TLoff is kept at the initial-round value TLoff(1) set in step S8.

During the period from the time point t2 after the lapse of the prescribed time Δt1 from the unlocking control start time t1 to the time point t3 after lapse of the prescribed time Δt2, the unlocking torque TLoff is reset at 0.

During the period from the time point t3 to the time point t4 after the lapse of the prescribed time Δt1, the unlocking torque TLoff is set at a value larger than the value right before the reset time point t2 by the prescribed quantity of ΔTLoff.

During the period from the time point t4 to the time point t5 after the lapse of the prescribed time Δt2, the unlocking torque TLoff is rest at 0.

During the period from the time point t5 to the time point t6 after the lapse of the prescribed time Δt1, the unlocking torque TLoff is set at a value larger than the value right before the reset time point t4 by the prescribed quantity of ΔTLoff.

By the unlocking torque TLoff set as described above, upon the end of the unlocking of the torque diode 61, the fact is determined in step S4, and step S27 is the next step; by the unlocking torque TLoff(OLD) at the time when the unlocking can be carried out, the map represented by the broken line and the solid line in FIG. 10 is learned and updated. In the next round, on the basis of the updated data, the unlocking torque TLoff is determined in step S8 or step S9.

Consequently, step S27 corresponds to the operation of the unlocking torque setting means of the present invention.

In Example 2 described above, the operation is the same as that of Example 1 except for steps S21 to S27 shown in FIG. 15, that is, when the unlocking of the torque diode 61 by the initial-round unlocking torque TLoff(1) is not ended, an increase in the unlocking torque TLoff is carried out according to FIG. 16 instead of FIG. 12. Consequently, the same operation and effects as those of Example 1 can also be realized in this Example.

According to Example 2, by increasing the unlocking torque TLoff as shown in FIG. 16, that is, when the unlocking is not ended even after extending by a prescribed time Δt1 for the unlocking torque TLoff(OLD) set in the last round, the unlocking torque TLoff is first set at 0, and then the unlocking torque is reset at a larger value of the unlocking torque (TLoff(OLD)+ΔTLoff). In this way, the unlocking torque TLoff is increased. In this case, different from the state without increasing the value of the unlocking torque TLoff, a larger unlocking torque (TLoff(OLD)+ΔTLoff) is adopted, so that the kinetic energy of the velocity portion is added as the unlocking energy to the torque diode 61, so that it is possible to end the unlocking of the torque diode 61 more reliably even with the same quantity of the unlocking torque.

In the Examples described above, an explanation has been made regarding the case when the irreversible rotary transmission system is the crankshaft rotational position control system of the driving force distribution controller 1. However, the idea of the present invention is not limited to the Examples presented herein. The present invention may also be adopted in the other irreversible rotary transmission systems.

In the Examples described above, the torque diode 61 shown in FIG. 2 and FIG. 6 to FIG. 8 is taken as the irreversible rotation transmission element. However, the irreversible rotation transmission element is not limited to such a torque diode.

The invention claimed is:

1. An unlocking controller of an irreversible rotary transmission system that comprises an input shaft that inputs torque from an actuator, an output shaft that outputs torque from the input shaft, and an irreversible rotation transmission element arranged between the input shaft and the output shaft; the irreversible rotation transmission element enacts driving control of the actuator so that, when torque is transmitted from the input shaft to the output shaft, the torque becomes greater than unlocking torque, so that the irreversible rotation transmission element is a lock released state that allows transmission of the torque; in a transmission-off state where the torque is not transmitted from the input shaft to the output shaft, the irreversible rotation transmission element is locked by a load torque of the output shaft, so that transmission of the load torque of the output shaft to the input shaft is prohibited;

the unlocking controller comprising:
an input shaft rotation direction determination section that determines whether an input shaft rotational direction is the same as, or opposite to, a direction of the load torque of the output shaft; and
an unlocking torque setting section that based on to a determination result of the input shaft rotation direction determination section conducts an unlocking torque control that sets the unlocking torque a higher value when the input shaft rotational direction and the direction of the load torque of the output shaft are the same as while the lock is released, than when the input shaft rotational direction is opposite to the direction of the load torque of the output shaft.

2. The unlocking controller according to claim 1, wherein the unlocking torque setting section uses a preset torque value with a magnitude needed for unlocking as the unlocking torque.

3. The unlocking controller according to claim 1, wherein the unlocking controller controls the actuator to end the unlocking torque control when a determination is made by the unlocking end determination section that the lock released state is present,
the unlocking end determination section determines whether the lock released state is present when a rotational velocity of the output shaft is greater than a prescribed velocity, and
the unlocking torque setting section continues to maintain the unlocking torque on the input shaft, until the unlocking end is determined.

4. The unlocking controller according to claim 1, wherein the unlocking torque setting section gradually increases the unlocking torque when the unlocking torque control is not ended within a prescribed time for applying the prescribed unlocking torque.

5. The unlocking controller according to claim 1, wherein the unlocking torque setting section conducts the unlocking torque control such that when the unlocking torque control is not ended within a prescribed time for applying the prescribed unlocking torque has lapsed, the unlocking torque is set at 0, and then a higher unlocking torque is reset.

6. The unlocking controller according to claim 4, wherein the unlocking torque setting section conducts the unlocking torque control such that when the unlocking torque control is not ended within the prescribed time for applying the prescribed unlocking torque has lapsed, the unlocking torque that can ultimately end the unlocking is stored, and, in a next execution of the unlocking torque control, the stored unlocking torque is initially adopted.

7. The unlocking controller according to claim 5, wherein the unlocking torque setting section conducts the unlocking torque control such that when the unlocking torque control is not ended within the prescribed time for applying the prescribed unlocking torque has lapsed, the unlocking torque that can ultimately end the unlocking is stored, and, in a next execution of the unlocking torque control, the stored unlocking torque is initially adopted.

8. The unlocking controller according to claim 2, wherein the unlocking controller controls the actuator to end the unlocking torque control when a determination is made by the unlocking end determination section that the lock released state is present,
the unlocking end determination section determines whether the lock released state is present when a rotational velocity of the output shaft is greater than a prescribed velocity, and
the unlocking torque setting section continues to maintain the unlocking torque on the input shaft, until the unlocking end is determined.

9. The unlocking controller according to claim 8, wherein the unlocking torque setting section gradually increases the unlocking torque when the unlocking torque control is not ended within a prescribed time for applying the prescribed unlocking torque.

10. The unlocking controller according to claim 8, wherein the unlocking torque setting section conducts the unlocking torque control such that when the unlocking torque control is not ended within a prescribed time for applying the prescribed unlocking torque has lapsed, the unlocking torque is set at 0, and then a higher unlocking torque is reset.

11. The unlocking controller according to claim 10, wherein
the unlocking torque setting section conducts the unlocking torque control such that when the unlocking torque control is not ended within the prescribed time for applying the prescribed unlocking torque has lapsed, the unlocking torque that can ultimately end the unlocking is stored, and, in a next execution of the unlocking torque control, the stored unlocking torque is initially adopted.

12. The unlocking controller according to claim 9, wherein the unlocking torque setting section conducts the unlocking torque control such that when the unlocking torque control is not ended within the prescribed time for applying the prescribed unlocking torque has lapsed, the unlocking torque that can ultimately end the unlocking is stored, and, in a next execution of the unlocking torque control, the stored unlocking torque is initially adopted.

13. The unlocking controller according to claim 2, wherein the unlocking torque torque setting section gradually increases the unlocking torque when the unlocking torque control is not ended within a prescribed time for applying the prescribed unlocking torque.

14. The unlocking controller according to claim 13, wherein
the unlocking torque setting section conducts the unlocking torque control such that when the unlocking torque control is not ended within a prescribed time for applying the prescribed unlocking torque has lapsed, the unlocking torque is set at 0, and then a higher unlocking torque is reset.

15. The unlocking controller according to claim 14, wherein
the unlocking torque setting section conducts the unlocking torque control such that when the unlocking torque control is not ended within the prescribed time for applying the prescribed unlocking torque has lapsed, the unlocking torque that can ultimately end the unlocking is stored, and, in a next execution of the unlocking torque control, the stored unlocking torque is initially adopted.

16. The unlocking controller according to claim 13, wherein
the unlocking torque setting section conducts the unlocking torque control such that when the unlocking torque control is not ended within the prescribed time for applying the prescribed unlocking torque has lapsed, the unlocking torque that can ultimately end the unlocking is stored, and, in a next execution of the unlocking torque control, the stored unlocking torque is initially adopted.

17. The unlocking controller according to claim 3, wherein the unlocking torque setting section gradually increases the unlocking torque when the unlocking torque control is not ended within a prescribed time for applying the prescribed unlocking torque.

18. The unlocking controller according to claim 17, wherein
the unlocking torque setting section conducts the unlocking torque control such that when the unlocking torque control is not ended within a prescribed time for applying the prescribed unlocking torque has lapsed, the unlocking torque is set at 0, and then a higher unlocking torque is reset.

19. The unlocking controller according to claim 18, wherein
the unlocking torque setting section conducts the unlocking torque control such that when the unlocking torque control is not ended within the prescribed time for applying the prescribed unlocking torque has lapsed, the unlocking torque that can ultimately end the unlocking is stored, and, in a next execution of the unlocking torque control, the stored unlocking torque is initially adopted.

20. The unlocking controller according to claim 17, wherein
the unlocking torque setting section conducts the unlocking torque control such that when the unlocking torque control is not ended within the prescribed time for applying the prescribed unlocking torque has lapsed, the unlocking torque that can ultimately end the unlocking is stored, and, in a next execution of the unlocking torque control, the stored unlocking torque is initially adopted.

* * * * *